(12) United States Patent
Shimizu et al.

(10) Patent No.: US 11,546,509 B2
(45) Date of Patent: Jan. 3, 2023

(54) PORTABLE DEVICE

(71) Applicant: MAXELL, LTD., Kyoto (JP)

(72) Inventors: Hiroshi Shimizu, Kyoto (JP);
Yasunobu Hashimoto, Kyoto (JP);
Ikuya Arai, Kyoto (JP)

(73) Assignee: MAXELL, LTD., Kyoto (JP)

( * ) Notice: Subject to any disclaimer, the term of this patent is extended or adjusted under 35 U.S.C. 154(b) by 80 days.

(21) Appl. No.: 16/769,614

(22) PCT Filed: Jan. 22, 2018

(86) PCT No.: PCT/JP2018/001736
§ 371 (c)(1),
(2) Date: Jun. 4, 2020

(87) PCT Pub. No.: WO2019/142347
PCT Pub. Date: Jul. 25, 2019

(65) Prior Publication Data
US 2020/0344412 A1  Oct. 29, 2020

(51) Int. Cl.
*H04N 5/232* (2006.01)
*H04W 4/029* (2018.01)
*H04N 5/247* (2006.01)
*H04W 4/02* (2018.01)

(52) U.S. Cl.
CPC ..... *H04N 5/23238* (2013.01); *H04N 5/23293* (2013.01); *H04N 5/247* (2013.01); *H04W 4/026* (2013.01); *H04W 4/027* (2013.01); *H04W 4/029* (2018.02); *H04M 2250/52* (2013.01)

(58) Field of Classification Search
CPC .................................................. H04N 5/23238
See application file for complete search history.

(56) References Cited

U.S. PATENT DOCUMENTS

| 2006/0001757 | A1 | 1/2006 | Sawachi |
| 2006/0155466 | A1* | 7/2006 | Kanda ............... H04M 1/72403 701/420 |
| 2016/0001757 | A1 | 1/2016 | Grangette et al. |

(Continued)

FOREIGN PATENT DOCUMENTS

| JP | 2006-020166 A | 1/2006 |
| JP | 2009-058648 A | 3/2009 |

(Continued)

*Primary Examiner* — Daniel T Tekle
(74) *Attorney, Agent, or Firm* — Mattingly & Malur, PC

(57) ABSTRACT

The portable device is provided with a photograph unit to acquire, at a first time interval, images with a super wide angle of which a maximum value reaches all peripheral directions around the portable device; a traveling direction calculation unit to calculate a traveling direction of the portable device at a second time interval; an image segmentation unit to segment, as a traveling direction image, an image of a predetermined range where the traveling direction is positioned at a center thereof, from a latest acquired image every time the traveling direction calculation unit calculates the traveling direction; and a display control unit to display the traveling direction image on a predetermined traveling direction display region of a display of the portable device. The display control unit displays a video image designated by a user on a first display region, which is different from the traveling direction display region.

4 Claims, 16 Drawing Sheets

(56) References Cited

U.S. PATENT DOCUMENTS

2016/0080650 A1 3/2016 Okazawa et al.
2018/0225513 A1* 8/2018 Bender .................. G06F 3/017

FOREIGN PATENT DOCUMENTS

| JP | 4264099 B2 | 5/2009 |
| JP | 2012-73541 A | 4/2012 |
| JP | 2014-220723 A | 11/2014 |
| JP | 2017-005335 A | 1/2017 |

* cited by examiner

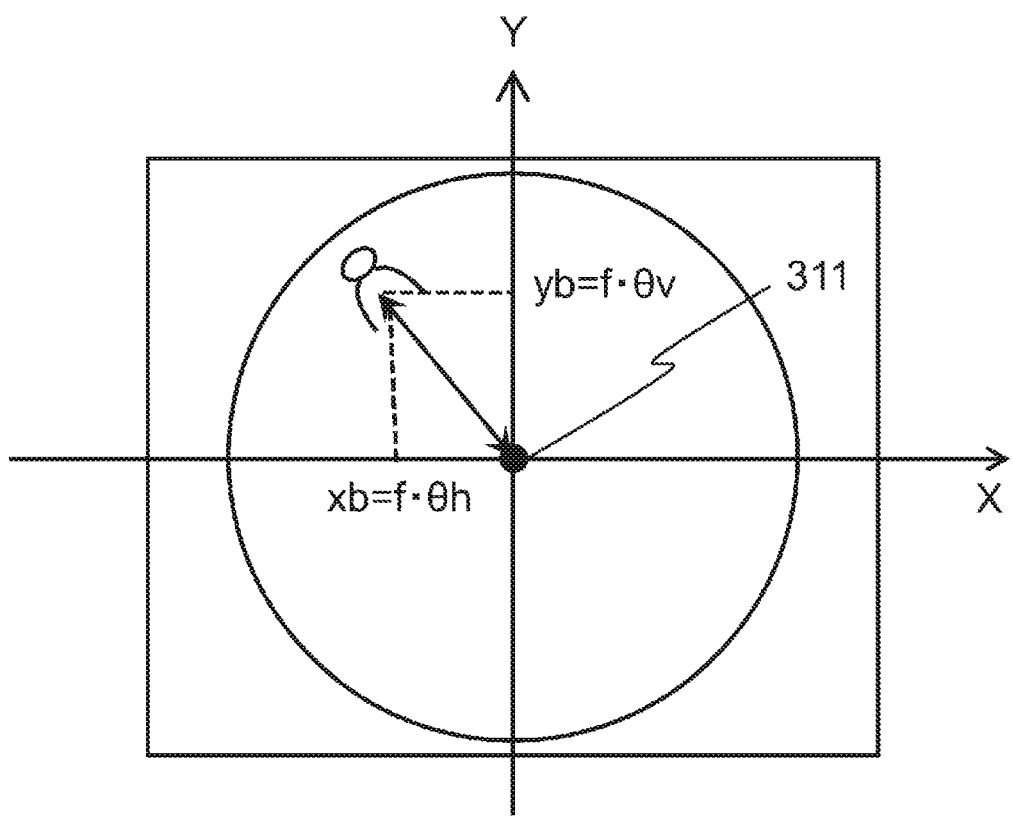

PORTABLE DEVICE

TECHNICAL FIELD

The present invention relates to a portable device. In particular, the present invention relates to a technique for displaying an image of a traveling direction on a portable device.

BACKGROUND ART

The portable device includes a photograph unit and a display unit for displaying a captured image. Using these units, a technique for displaying an image obtained by photographing a traveling direction on the display unit has been known. For example, Patent Literature 1 discloses "a portable device comprising: a photographing means, a direction specifying means for specifying a traveling direction of an own device, a photographing control means for making the photographing means capture a video image of the traveling direction, and a display means for displaying the video image of the traveling direction and an image displayed based on an instruction of a user" (excerpted from Summary).

CITATION LIST

Patent Literature

Patent Literature 1: JP 2017-5335 A

SUMMARY OF INVENTION

Technical Problem

According to the technique disclosed in Patent Literature 1, the image displayed based on the instruction of the user and the video image captured by the photographing means are simultaneously displayed on a display screen of the portable device. Here, the image displayed based on the instruction of the user is a screen of an application, for example, a game. The photographing means is arranged only in three directions, namely, on the front of the portable device, on the right thereof by 45 degrees, and on the left thereof by 45 degrees, and an image to be displayed is switched between the images acquired by either of the photographing means in accordance with change in the traveling direction of the user. Since the displayed video image is switched at each 45 degrees, it cannot be said that it is easy for the user to watch the displayed video image. In addition, an image to be displayed is the video image acquired by either of the photographing means, it is not necessarily the video image of the traveling direction of the user. Therefore, necessary information to a user who is moving while watching the screen of the portable device cannot be appropriately provide.

The present invention has been made in view of the circumstances above, and an objective of the present invention is to provide a portable device capable of appropriately providing a user with necessary surrounding information without decreasing convenience.

Solution to Problem

The present invention provides a portable device which is held by a user and configured to be provided with a photograph unit configured to acquire, at a first time interval, images with a super wide angle of which a maximum value reaches all peripheral directions around the portable device; a traveling direction calculation unit configured to calculate a traveling direction of the portable device at a second time interval; an image segmentation unit configured to segment, as a traveling direction image, an image of a predetermined range in which the traveling direction is positioned at a center thereof, from a latest one of the acquired images every time the traveling direction calculation unit calculates the traveling direction; and a display control unit configured to display the traveling direction image on a predetermined traveling direction display region of a display of the portable device, wherein the display control unit is further configured to display a video image designated by a user on a first display region, which is different from the traveling direction display region, of the display.

Advantageous Effects of Invention

A portable device capable of appropriately providing a user with necessary surrounding information without decreasing convenience can be provided. The problems, configurations, and effects other than those described above will be clarified by explanation of the embodiments below.

BRIEF DESCRIPTION OF DRAWINGS

FIG. 6 explains a relationship between a pixel position and a photographing direction according to the first embodiment.

DESCRIPTION OF EMBODIMENTS

Hereinafter, embodiments of the present invention will be described with reference to the accompanying drawings. In the following description, elements having the same functions are provided with the same reference signs unless otherwise specified, and repetitive explanation thereof will be omitted. In addition, an "image" referred herein includes both a moving image and a still image.

First Embodiment

First, an outline of a first embodiment of the present invention will be described. A portable device according to the present embodiment includes a camera capable of acquiring all-direction (360-degree (omnidirectional)) images in a three-dimensional plane so as to continuously acquire all-around images. The portable device is configured to extract an image of a traveling direction of a user from the acquired images and display it on a display thereof. The traveling direction of the user is determined by a sensor provided in the portable device.

Figure 1A:
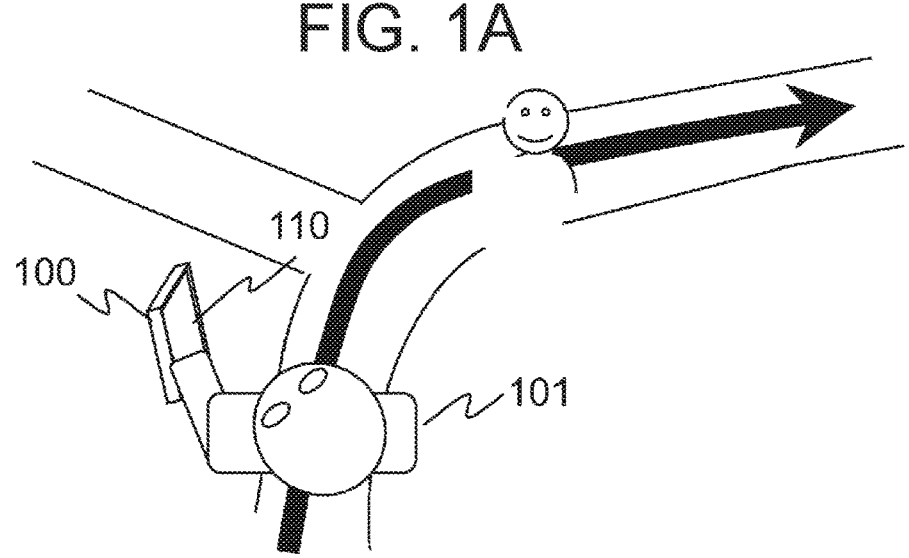
FIG. 1A and FIG. 1B explain an outline of a first embodiment.
Figure 1B:
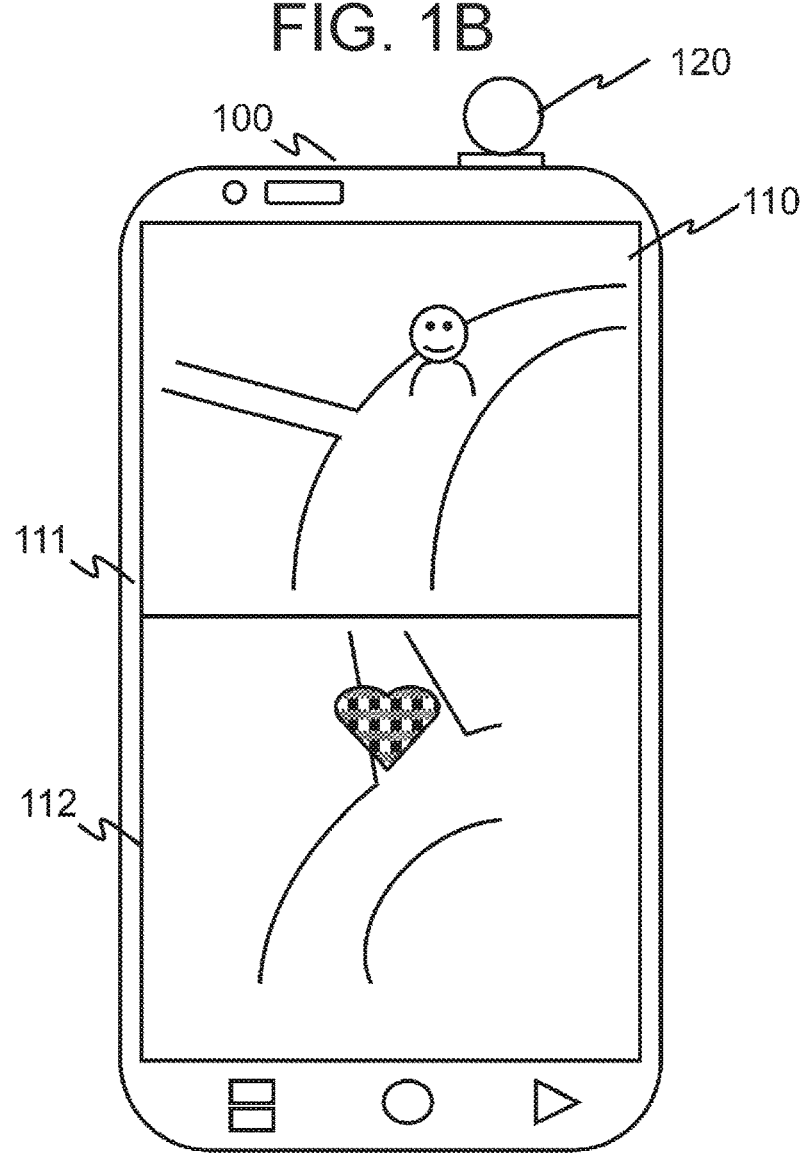

As illustrated in FIG. 1A, in the present embodiment, a user 101 holds a portable device 100 and moves while watching an image on a display 110. At this time, in the portable device 100, a predetermined application runs, and as illustrated in FIG. 1B, the image of the application is displayed on a region 112 which is a part of the display 110. Furthermore, an image of the traveling direction of the user 101 is displayed on another region 111 of the display 110.

Hereinafter, the region 112 is referred to as a first display region 112, and the region 111 is referred to as a traveling direction display region 111.

In an example of FIG. 1B, a game application runs as a predetermined application. Accordingly, an image relating to the game application is displayed on the first display region 112. That is, the first display region is an arbitrary application screen that displays an image of an arbitrary application.

On the traveling direction display region 111, an image of the traveling direction of the user 101, which is segmented from an image captured by a camera 120 provided in the portable device 100, is displayed. In the present embodiment, the camera 120 is configured to constantly acquire 360-degree images around the portable device 100. Then, the portable device 100 determines the traveling direction of the user 101 based on signals from various sensors provided therein, extracts an image of the traveling direction, and displays the image on the traveling direction display region 111.

Figure 2:
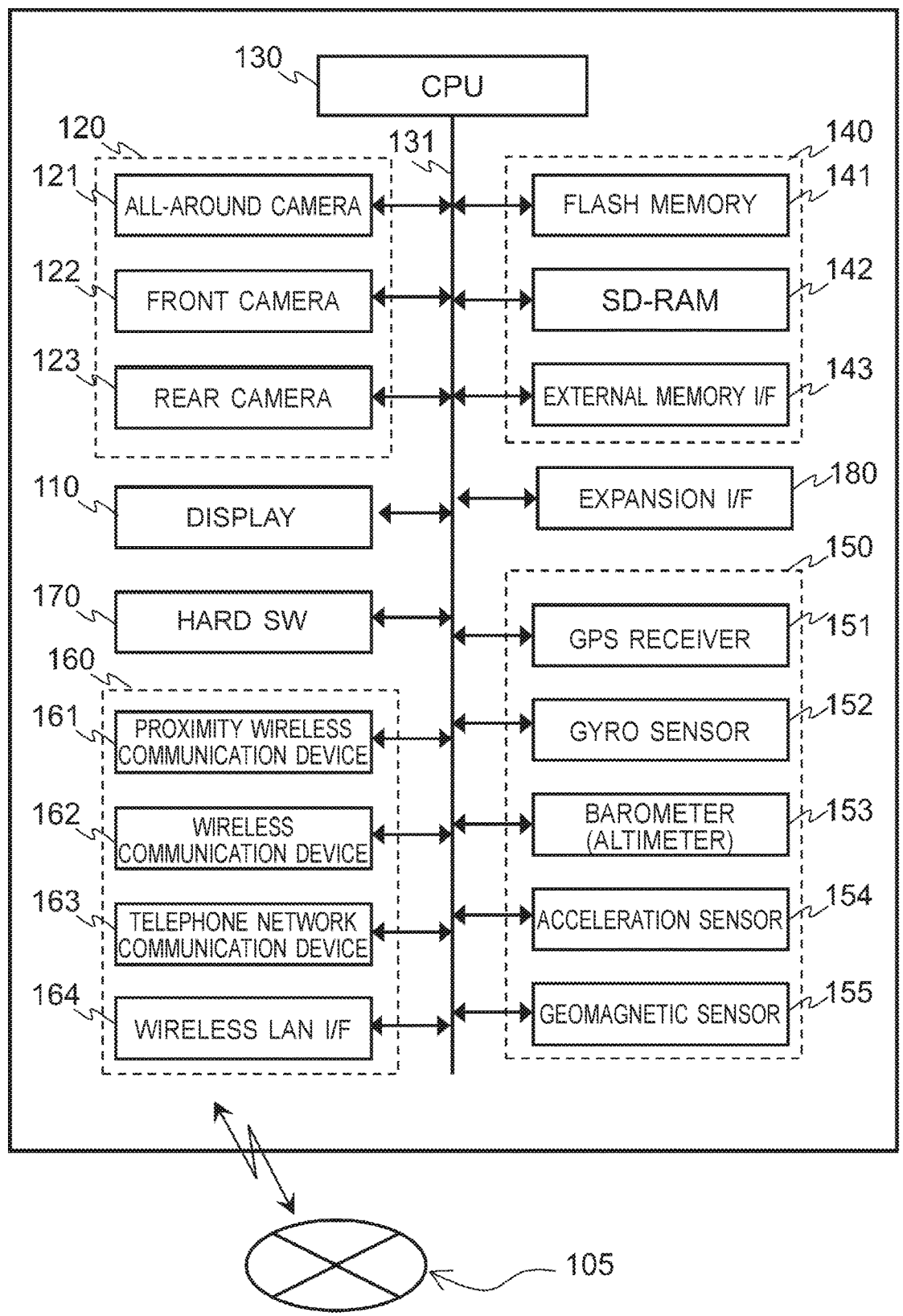
FIG. 2 is a hardware configuration diagram of a portable device according to the first embodiment.

In the following, a hardware configuration of the portable device 100 according to the present embodiment for realizing the above will be described. FIG. 2 is a hardware configuration diagram of the present embodiment.

As illustrated in FIG. 2, the portable device 100 includes the display 110, the camera 120, a CPU 130, a storage device 140, a sensor 150, a communication device 160, a hardware switch (hard SW) 170, an expansion interface (I/F) 180, and a system bus 131.

The CPU 130 is a microprocessor unit configured to control the entire of the portable device 100. The system bus 131 is a data communication path for transmitting and receiving data between the CPU 130 and each operation block within the portable device 100. The system bus 131 extends from the CPU 130 and is connected to the hardware configured be controlled by the CPU 130 and to acquire information.

The storage device 140 includes a flash memory 141, a SD-RAM (Synchronous Dynamic Random Access Memory) 142, and an external memory interface (I/F) 143.

The flash memory 141 functions as a storage. The flash memory 141 is configured to store basic operation programs such as an operating system, other operation programs, and various data necessary for operating the operation programs. For example, map data which is not frequently updated is also stored therein.

The SD-RAM 142 is a work area used at the time of execution of the basic operation program and/or other operation programs.

The external memory I/F 143 is a connection interface for an external memory such as a memory card. The external memory stores data having large capacity but no emphasis on access speed, such as music data and moving image data. In the present embodiment, for example, the external memory stores data such as image files captured by the camera 120 and/or data downloaded from a network.

In this connection, the flash memory 141 and the SD-RAM 142 may be configured to be integrated with the CPU 130 as one unit. Furthermore, each operation program stored in the flash memory 141 may be updated and each function thereof may be expanded by, for example, download processing from each distribution server on a network 105.

The communication device 160 includes a proximity wireless communication device 161, a wireless communication device 162, a telephone network communication device 163, and a wireless LAN I/F 164.

The proximity wireless communication device 161 is, for example, an NFC tag reader, and used at the time of shopping to read an NFC tag attached to a product. The radio communication device 162 is an interface such as a Bluetooth (registered mark) communication. The telephone network communication device 163 is an interface for performing telephone call and transmitting and receiving data by wireless communication with a base station of a mobile telecommunication network. The wireless LAN I/F 164 is an I/F for connecting the portable device 100 to the network 105 through a public Wi-Fi station, etc.

In this connection, the communication device 160 may also be applied to and utilized for measurement of a current position of the portable device 100.

The sensor 150 is a group of sensors for detecting a position and a state of the portable device 100. In the present embodiment, for example, the sensor 150 includes a GPS (Global Positioning System) receiver 151, a gyro sensor 152, a barometer (altimeter) 153, an acceleration sensor 154, and a geomagnetic sensor 155.

The acceleration sensor 154 is configured to detect the acceleration of the portable device 100. In the present embodiment, the acceleration sensor 154 detects the acceleration of each direction of x-axis, y-axis, and z-axis of a device coordinate system set in the portable device 100. The unit of detected values is "G" (1.0 G is about 9.8 m/s2) based on gravitational acceleration. The measured acceleration is integrated once to calculate moving speed of the portable device 100, and then is integrated again to calculate a moving distance of the portable device 100. The calculated moving speed and moving distance, in combination with detection results of other sensors as will be described later, can be used to calculate a traveling direction of the portable device 100 and a position thereof on a map.

The gyro sensor 152 is configured to detect the posture (inclination) of the portable device 100. In the present embodiment, the gyro sensor 152 detects rotational speed (angular velocity) around each of the x-axis, the y-axis, and the z-axis on the device coordinate system set in the portable device 100. The unit of the detected angular velocity is rad/s (radian per second).

The GPS receiver 151 is a radio wave reception processing unit configured to receive a signal from a positioning satellite such as a GPS satellite to measure a current position of the portable device 100. The barometer (altimeter) 153 is configured to measure the atmospheric pressure to calculate the current altitude (elevation) based on the measured atmospheric pressure. The geomagnetic sensor 155 is configured to detect a direction of the geomagnetism and output an orientation of the portable device 100. The current position detected by the GPS receiver 151, the altitude measured by the barometer 153, and the orientation output by the geomagnetic sensor 155 are output as values of the coordinate system, for example, with the x-axis as the longitude, the y-axis as the latitude, and the z-axis as the altitude.

The group of these sensors detects the position, inclination, orientation, movement, etc. of the portable device 100. The position information is acquired by the GPS receiver 151 as described above. However, in a case where GPS radio waves are difficult to be received, it may be acquired by the telephone network communication device 163 in accordance with a position information acquisition method using position information of a base station and propagation delay of telephone communication radio waves. Furthermore, it may be acquired by using position information of an AP (access point) device of Wi-Fi through the wireless LAN I/F 164. In addition, the group of these sensors do not necessarily include all of the sensors.

The display 110 is a display device such as a liquid crystal panel, and configured to display image data processed by the CPU 130 and provide the user with the image data. In a case where the portable device 100 includes an image signal processor, the image data may be processed by the image signal processor. In any case, a video RAM (not illustrated) is provided in the portable device 100, and the display 110 is driven based on image data input to the video RAM. The CPU 130 or the image signal processor performs conversion of formats and superposition of menus and other OSD (On-Screen Display) signals as required.

In the present embodiment, the display 110 also functions as an operation device for receiving input of an operation instruction to the portable device 100. In the present embodiment, a touch panel which is arranged to be superimposed on the display 110 is adopted.

The operation instruction is also accepted via the hard SW 170. In addition, the operation instruction to the portable device 100 may be accepted via an operation device such as a keyboard connected to the expansion I/F 180. Furthermore, it may be accepted via a separate portable information terminal device connected to the portable device 100 by wired communication or wireless communication. In this connection, the hard SW 170 is a power supply SW for operating the portable device 100.

The expansion I/F 180 is a group of interfaces for expanding the functions of the portable device 100. In the present embodiment, a video/audio I/F, a USB (Universal Serial Bus) I/F, etc. are provided. The video/audio I/F is configured to input a video/audio signal from an external video/audio output device, and output a video/audio signal to an external video/audio input device. The USB I/F is connected to other devices such as a PC (Personal Computer) to transmit and receive data. The USB I/F may be connected to a keyboard or other USB devices.

The camera 120 is a photograph device including an image sensor for converting light incident through a lens into an electrical signal (digital information). The image sensor is an electronic device such as a CCD (Charge-Coupled Device) and a CMOS (Complementary Metal Oxide Semiconductor). The electrical signal output from the image sensor is referred to as RAW data.

In the present embodiment, an all-around camera 121 is at least provided. The all-around camera 121 is a camera capable of photographing all peripheral directions (360 degrees) around the portable device 100. The details of the all-around camera 121 will be described later. In addition, the portable device 100 may be configured to include a front camera 122 disposed on a face of the display 110 side thereof and a rear camera 123 disposed on a face opposite to the display 110 thereof. The front camera 122 captures an image of, for example, the user himself/herself while the rear camera 123 performs normal photographing.

[Function Block]

Figure 3:
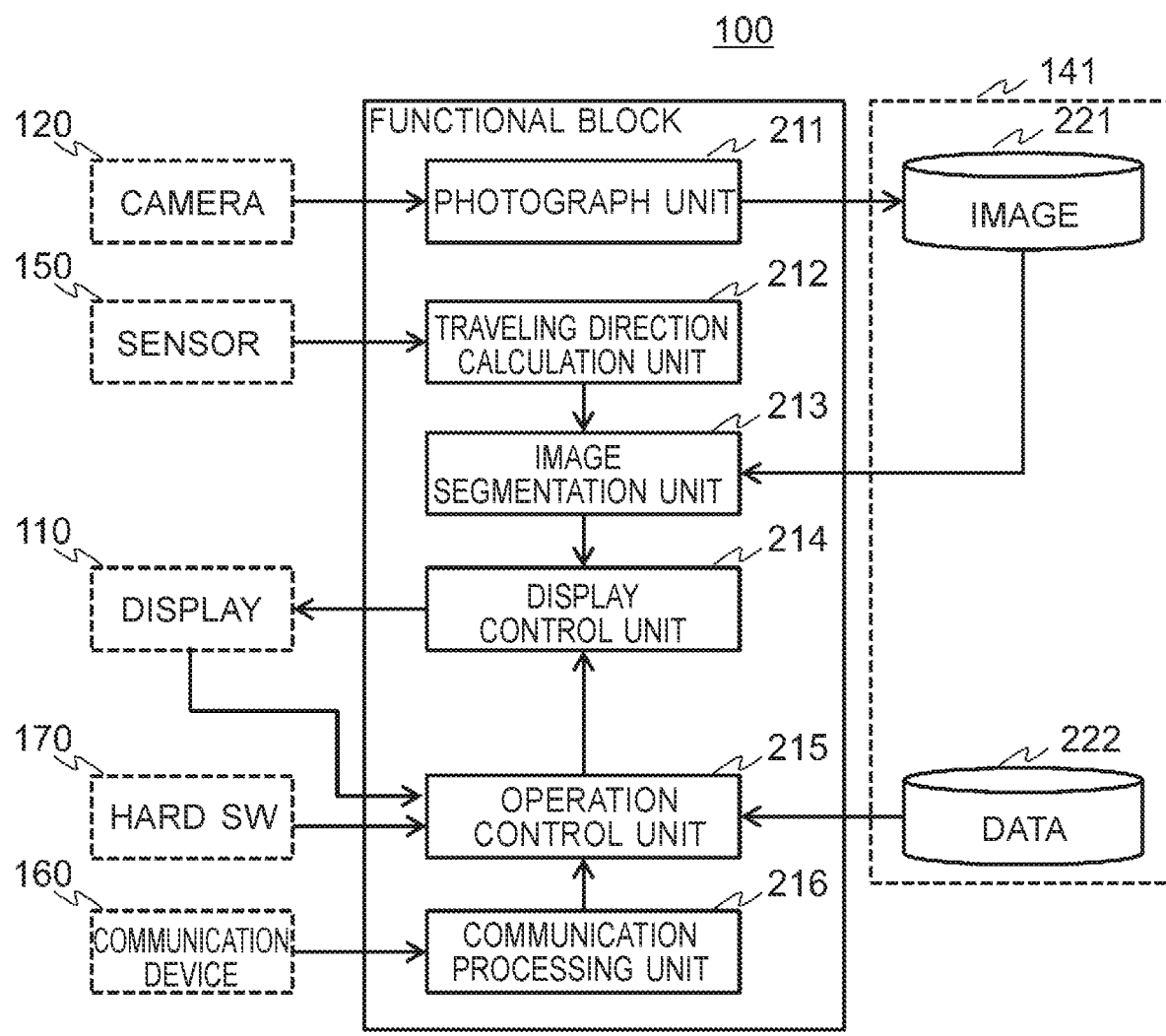
FIG. 3 is a functional block diagram of a portable device according to the first embodiment.

Next, functions of the portable device 100 according to the present embodiment will be described. FIG. 3 is a functional block diagram of the portable device 100 according to the present embodiment. Hereinafter, a configuration relating to a traveling direction photograph and display function will be mainly described in particular.

The portable device 100 includes a photograph unit 211, a traveling direction calculation unit 212, an image segmentation unit 213, a display control unit 214, an operation control unit 215, and a communication processing unit 216. The portable device 100 also includes an image storage unit 221 and a data storage unit 222.

The photograph unit 211 is an image processing engine configured to store the RAW data acquired through the camera 120 in the image storage unit 221 as image data at a predetermined time interval. The image storage unit 221 includes each pixel memory that corresponds to each image sensor of the camera 120. The photograph unit 211 is configured to perform various types of image processing with respect to the RAW data and write the RAW data in the corresponding pixel memory. In the present embodiment, the processing above may be performed by using not only the RAW data which is data output from the camera 120, but also common image data such as JPEG data which can be obtained through a signal-processing LSI generally mounted together with a camera sensor.

In the present embodiment, the photograph unit 211 stores, as an all-around image, the RAW data with a 360-degree range around the portable device 100, which is acquired by the all-around camera 121, in the image storage unit 221. The relationship between arrangement positions of each image sensor and photographing directions of the RAW data acquired by the image sensors will be described later. In this connection, when storing the RAW data in the image storage unit 221, the acquisition time may be also stored in association therewith. Furthermore, the photograph unit 211 may be included in the camera 120.

The traveling direction calculation unit 212 is configured to determine a traveling direction of the user 101 of the portable device 100. The traveling direction is determined by using the output of the sensor 150. In the present embodiment, the output of the acceleration sensor 154 and the output of the gyro sensor 152 are used to determine the traveling direction.

In the present embodiment, for example, the output values of the acceleration sensor 154, i.e., the values of each of the x-axis direction, the y-axis direction, and the z-axis direction (components of each axis) of the device coordinate system are integrated so as to obtain the speed of each axis direction at that time and determine a traveling direction as a composite value of speed vectors of each axis direction. At this time, by using the output value of the gyro sensor 152, the amount of inclination of each axis direction is corrected based on reference posture. For example, the gyro sensor 152 detects an inclination vector of the holding direction of the portable device 100. Then, by using the inclination vector, the integrated value (speed) obtained and output by the acceleration sensor 154 is corrected to be the speed of the traveling direction with respect to the ground. In the present embodiment, the traveling direction is calculated as, for example, a unit vector having components in each axis direction of the device coordinate system. The determined traveling direction is output to the image segmentation unit 213.

The image segmentation unit 213 is configured to segment an image corresponding to the traveling direction determined by the traveling direction calculation unit 212 from the latest image stored in the image storage unit 221. In the present embodiment, for example, an image having a predetermined size (segmentation size) in which the traveling direction expressed by the device coordinates is positioned at the center thereof is segmented and extracted. The extracted image (traveling direction image) is output to the display control unit 214.

The segmentation size is predetermined. In this connection, the segmentation size may be determined in accordance with the speed calculated by using the output of the acceleration sensor 154. That is, the higher the speed is, the larger the segmentation size becomes.

As described above, in the present embodiment, the traveling direction calculated by the traveling direction calculation unit 212 is used to determine the center of the image to be segmented as the traveling direction image. Accordingly, it is desirable that a timing at which the photograph unit 211 stores the RAW data acquired by the camera 120 in the image storage unit 221 and a timing at which the traveling direction calculation unit 212 calculates the traveling direction are synchronized. However, these timings do not necessarily have to be synchronized. From the camera 120, a moving image (RAW data) is always output at a predetermined frame rate. Therefore, it may be configured that at the timing when the traveling direction calculation unit 212 calculates the traveling direction, the RAW data which is the latest at that time is processed.

The operation control unit 215 is configured to control the operation of various functions of the portable device 100, excluding the traveling direction display function described above. For example, the various functions include a game function, an information processing function, a call function, an information transmission/reception function, and a network retrieval function. Among these functions above, information, image data, and moving image data relating to display are output to the display control unit 214. An instruction from the user is input via the display 110 and the hard SW 170.

The communication processing unit 216 is configured to control communication via the communication device 160. In the present embodiment, the communication processing unit 216 controls the communication in accordance with an instruction from the operation control unit 215. Furthermore, the operation control unit 215 acquires information necessary for the control via the communication device 160.

The display control unit 214 is configured to control display on the display 110. In the present embodiment, as illustrated in FIG. 1B, a display region of the display 110 is divided into two regions. The display control unit 214 controls to display an image obtained from the data acquired by the all-around camera 121 on the traveling direction display region 111, and display an image of a processing result instructed by the user on the first display region 112. In other words, the display control unit 214 displays the traveling direction image received from the image segmentation unit 213 on the traveling direction display region 111, and displays the image received from the operation control unit 215 on the first display region 112.

These units are realized by the CPU 130 which executes programs stored in the flash memory 141 by loading them onto the SD-RAM 142. The image storage unit 221 and the data storage unit 222 are provided in the flash memory 141.

The data necessary for each unit to perform the processing is stored in the data storage unit 222. In addition, intermediate data calculated during the processing and final data obtained by the processing are also stored in the data storage unit 222.

[All-around Camera]

Hereinafter, the all-around camera 121 of the present embodiment will be described. In the following, a device coordinate system which is specific to the portable device 100 will be used to explain the all-around camera 121. In the device coordinate system, for example, the center of gravity of the portable device 100 is set as the origin, and the axis perpendicular to the display 110 is set as the z-axis. Furthermore, on a plane parallel to the display, the short direction is set as the x-axis direction, and the longitudinal direction is set as the y-axis direction. The origin is not limited to the center of gravity. For example, as will be described later, it may be the principal point of the all-around camera 121.

Figure 4A:
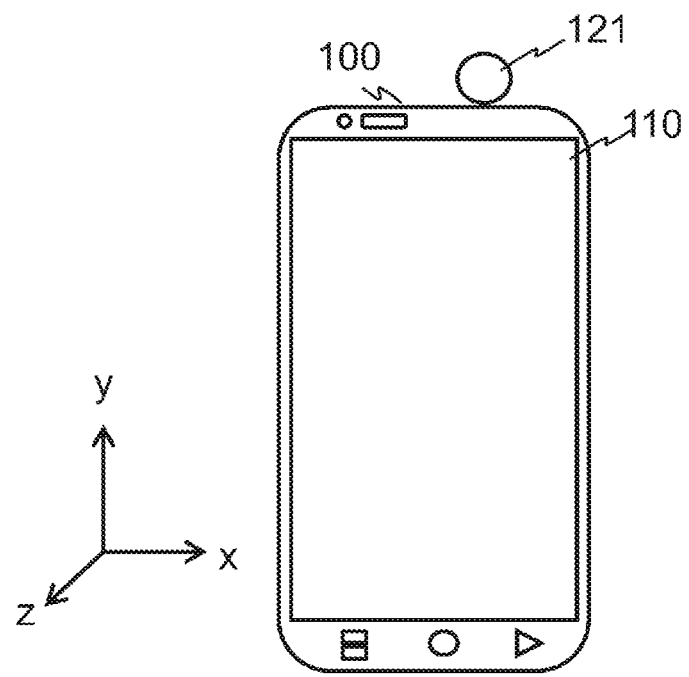
FIG. 4A and FIG. 4B explain an all-around camera according to the first embodiment.
Figure 4B:
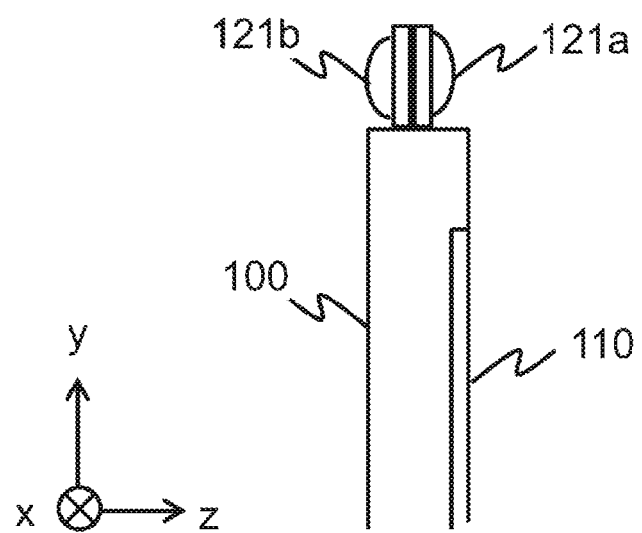

As illustrated in FIG. 4A and FIG. 4B, the all-around camera 121 is configured by two wide angle cameras 121a, 121b. Each of the wide angle camera 121a, 121b has, for example, a 180-degree angle of view in each of the x-axis direction and the y-axis direction, respectively.

Next, an optical system of the all-around camera 121 will be described with reference to FIGS. 5A to 5C.

Figure 5A:
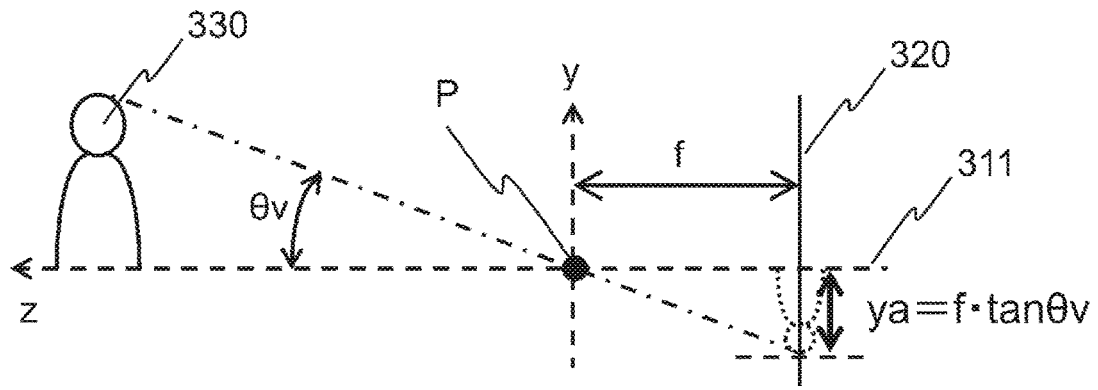
FIG. 5A explains an optical system configuration of an ordinary camera, and FIG. 5B and FIG. 5C explain an optical system configuration of an all-around camera according to the first embodiment.

FIG. 5A explains an optical system configuration of an ordinary camera. Generally, a point regarded as the center of a lens is called a principal point P. An image sensor 320 is disposed on a position apart by a distance f from the principal point P. The reference sign "f" indicates focal length of the optical lens.

As illustrated in FIG. 5A, in the optical system of the camera, light from all portions of an object to be photographed (subject) 330 always passes through the principal point P and is projected onto the image sensor 320. This is also the case for using an optical lens having a predetermined aperture, as well as the case for installing a lens referred to as a pinhole lens, in which a hole having a diameter as close to zero as possible is provided in a thin paper, on the principal point P.

Using this optical system, an image is captured in a state in which a lower end of the subject 330 is aligned with an optical axis 311 of the lens. Here, it is assumed that light from an upper end of the subject 330 is incident on the lens at an angle of view (incident angle) $\theta v$ which is made by the optical axis 311 and is projected onto a position ya of the image sensor 320. At this time, a value of the position ya is calculated by the following Equation (1).

$$ya = f \tan \theta v \qquad (1)$$

The maximum angle of view $\theta max$ that can be captured by this optical system depends on the focal length f and the size of the image sensor 320. For example, in order to make the maximum angle of view $\theta max$ close to 90 degrees, it is necessary to reduce the focal length f as much as possible or to increase the size of the image sensor 320 as much as possible. A practical photographing angle of view according to the present method is within a range of up to about θmax=50 degrees, and about 100 degrees vertically in total.

As described above, the all-around camera 121 of the present embodiment includes the two wide angle cameras 121a, 121b which are installed back-to-back. Each of the wide angle cameras 121a, 121b has a 180-degree angle of view in the y-axis direction and the x-axis direction, respectively. In the following, it is assumed that the principal point P is the origin of the device coordinate system and the optical axis 311 of the lens is the z-axis direction.

Figure 5B:
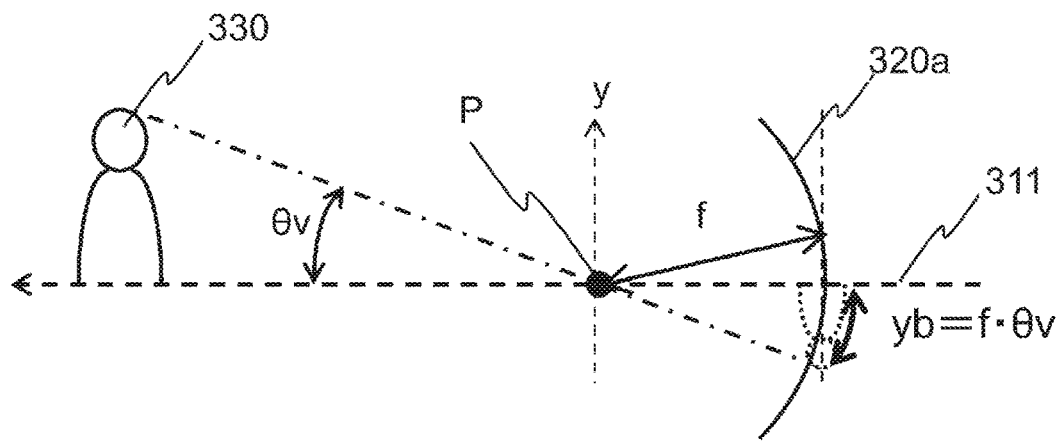

In such a case, as illustrated in FIG. 5B, light incident on the lens at an incident angle θv in the y-axis direction is projected onto a virtual curved surface 320a having a radius f. In this case, a projection position yb of the upper end of the subject 330 on the virtual curved surface 320a is calculated by the following Equation (2).

$$yb = f \cdot \theta v \quad (2)$$

That is, the light incident at the incident angle θv in the y-axis direction in the device coordinate system forms an image at the position yb on the virtual curved surface 320a.

Figure 5C:
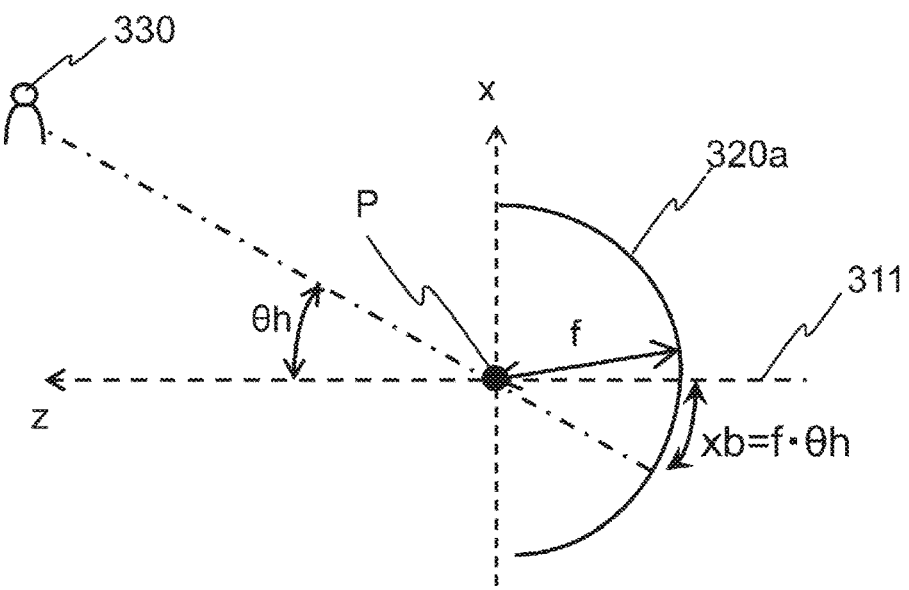

Similarly, as illustrated in FIG. 5C, light incident on the lens at an angle of view (incident angle) θh in the x-axis direction forms an image at a position xb on the virtual curved surface 320a having the radius f. In this case, the projection position xb of the upper end of the subject 330 on the virtual curved surface 320a is calculated by the following Equation (3).

$$xb = f \cdot \theta h \quad (3)$$

Therefore, the relationship between the incident angle in the x-axis direction and that in the y-axis direction, in other words, the photographing directions (θh, θv) and the imaging coordinates (xb, yb) on the virtual curved surface 320a is expressed by the following Equation (4).

$$(xb, yb) = (f \cdot \theta h, f \cdot \theta v) \quad (4)$$

The actual image sensor is not configured by a spherical surface, but by a flat surface as illustrated in FIG. 5A. In a case of the all-around camera 121 according to the present embodiment, for example, as illustrated in FIG. 6, the optical system is configured so as to form an image at a position corresponding to the distances xb, yb from the optical axis 311 (Equidistance Projection).

In accordance with the direction of the subject 330 (incident direction of light; incident angle θh in the x-axis direction and incident angle θv in the y-axis direction), the photograph unit 211 writes the RAW data acquired by the image sensor, which is on the position calculated by the Equation (4), in an image memory of a corresponding pixel position, and stores the data as image data.

In this connection, in order to realize the optical system illustrated in FIG. 5B by using the image sensor 320 having the planar structure as illustrated in FIG. 5A, for example, a fisheye lens configured to attach an image visible from the origin of the fisheye lens to a virtual hemispherical surface and form an image on an imaging surface such that an incident angle of light is proportional to the image height is used. Specifically, for example, by forming the optical system with a complicated lens configuration as disclosed in FIG. 6 of JP 2009-058648 A, the image sensor 320 having the planar structure corresponding to FIG. 5A can acquire the image as described above.

[Segmentation Center Pixel Calculation Method]

Next, a method of segmenting an image of a traveling direction from the images acquired by the all-around camera 121 will be described. The image segmentation unit 213 is configured to calculate, at the time of segmentation, θv and θh from the components of the x-axis direction, y-axis direction, and z-axis direction of the traveling direction which are calculated by the traveling direction calculation unit 212, and specify a corresponding pixel (xb, yb) as a segmentation center pixel. Then, the image segmentation unit 213 extracts, as a traveling direction image, a pixel group in a predetermined range in which the segmentation center pixel is positioned at the center thereof. The range of the pixel group to be extracted is predetermined according to resolution of the display 110.

Figure 7A:
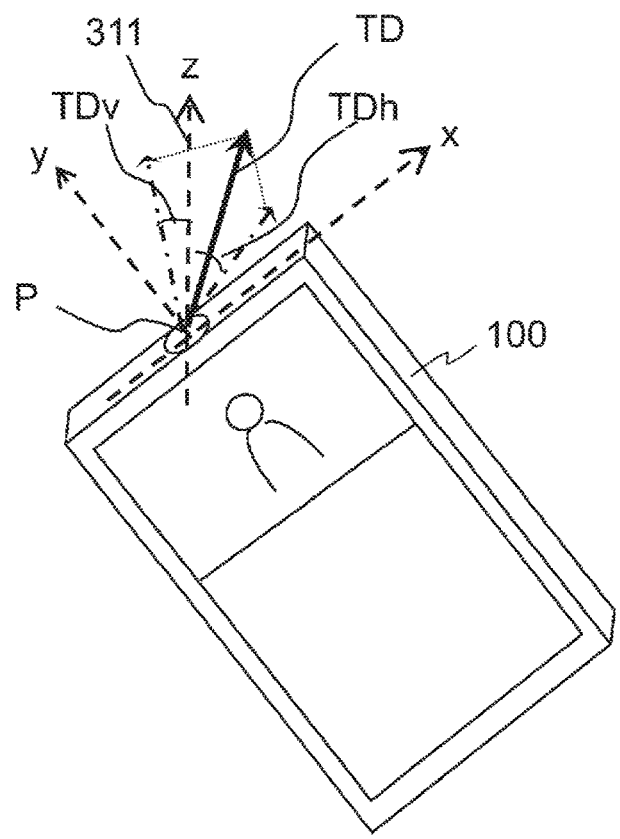
FIG. 7A and FIG. 7B explain a relationship between a pixel position and a photographing direction according to the first embodiment.

The traveling direction calculation unit 212 calculates a traveling direction TD as, for example, a unit vector on the device coordinate system. For example, when the traveling direction TD is obtained as illustrated in FIG. 7A, the image segmentation unit 213 firstly drops down a perpendicular line onto the xz-plane and calculates an angle TDh of the traveling direction TD, which corresponds to the incident angle θh in the x-axis direction. Furthermore, the image segmentation unit 213 drops down a perpendicular line onto the yz-plane and calculates an angle TDv of the traveling direction TD, which corresponds to the incident angle θv in the y-axis direction.

Figure 7B:
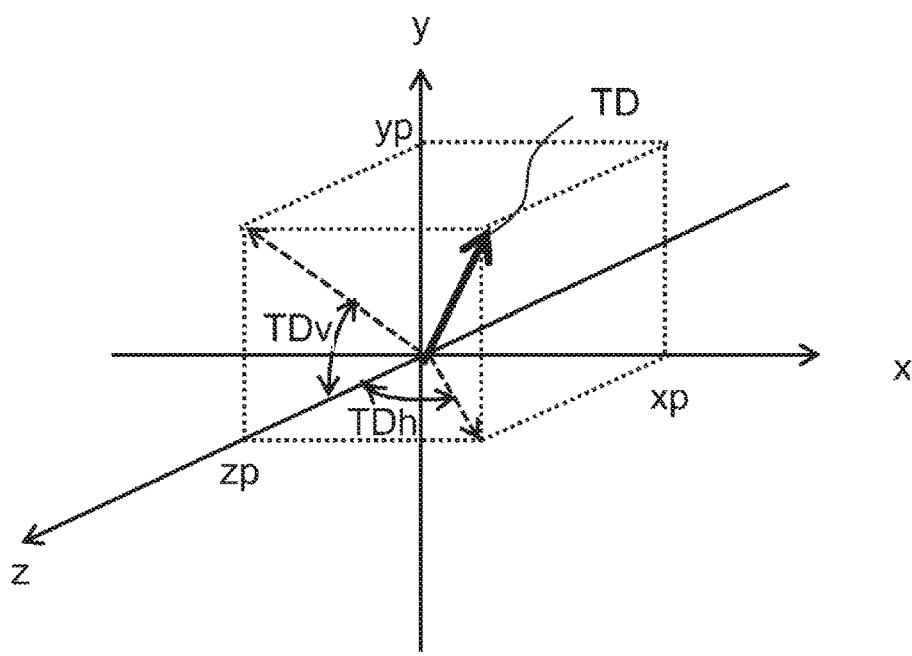

As illustrated in FIG. 7B, when the components in each axis direction of the unit vector obtained as the traveling direction TD are xp, yp, and zp, TDh and TDv are respectively expressed by the following Equation (5) and Equation (6).

$$TDh = \arctan(xp/zp) \quad (5)$$

$$TDv = \arctan(yp/zp) \quad (6)$$

Therefore, each component of the segmentation center pixel (xb, yb) is expressed by the following Equation (7) and Equation (8).

$$xb = f \cdot TDh = f \cdot \arctan(xp/zp) \quad (7)$$

$$yb = f \cdot TDv = f \cdot \arctan(yp/zp) \quad (8)$$

The image segmentation unit 213 obtains the segmentation center pixel from the components of each axis direction of the unit vector of the traveling direction calculated by the traveling direction calculation unit 212 in the procedure described above, and segments a pixel group in a predetermined range in which the segmentation center pixel is positioned at the center thereof to form a traveling direction image.

[Traveling Direction Image Display Processing]

Figure 8:
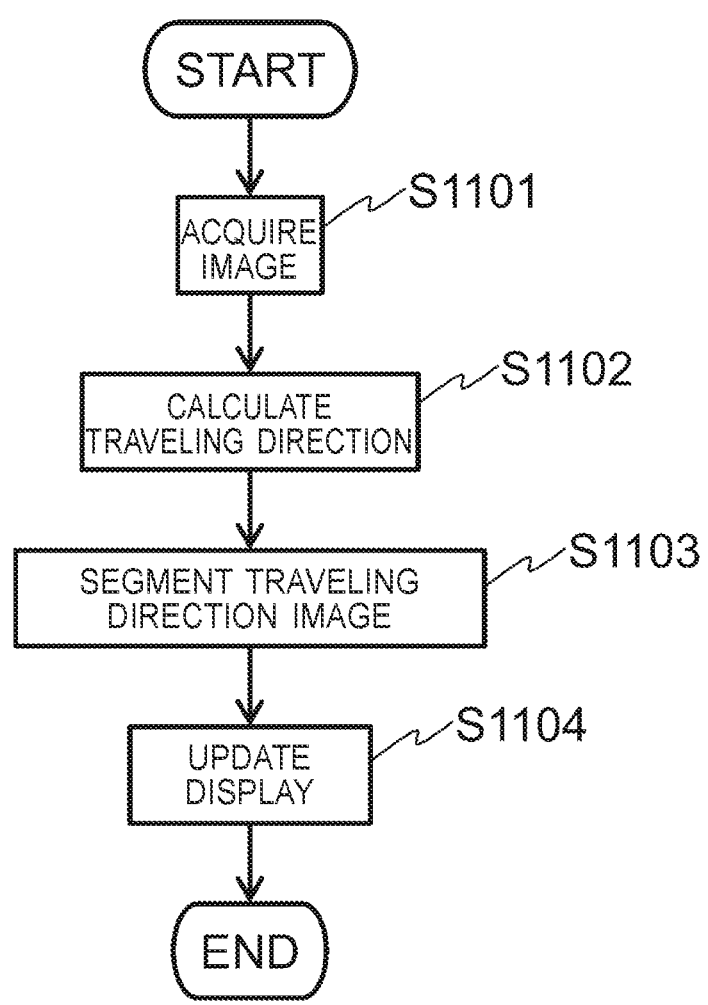
FIG. 8 illustrates a flow chart of traveling direction image display processing according to the first embodiment.

Next, a flow of traveling direction image display processing performed by the portable device 100 of the present embodiment will be described. FIG. 8 illustrates a processing flow of the traveling direction image display processing according to the present embodiment. This processing is executed at a predetermined time interval upon reception of an instruction to start a traveling direction display function of the portable device 100. The predetermined time interval is set to a very short period of time, such as every one second, every ten seconds, or the like. The instruction to start the traveling direction display function is received via the display 110 or the hard SW 170.

Hereafter, it is assumed that a timing of acquiring image by the photograph unit 211, in other words, a timing of storing an image in the image storage unit 221 is synchronized with a timing of calculating a traveling direction by the traveling direction calculation unit 212.

First, the photograph unit 211 performs photographing by storing images captured by the camera 120 in the image storage unit 221 (step S1101). At this time, the photograph unit 211 stores the data of each photographing region on each pixel position specified by the Equation (4) described above.

The traveling direction calculation unit 212 calculates a traveling direction TD of the portable device 100 based on signals acquired by the sensor 150 (step S1102). A result of calculation is a unit vector expressed by components of each axis direction of the device coordinate system.

In this connection, either of the image acquisition processing by the photograph unit 211 and the traveling direction determination processing by the traveling direction calculation unit 212 may be performed first.

After the traveling direction calculation unit 212 acquires the traveling direction, the image segmentation unit 213 specifies a segmentation center pixel (xb, yb) corresponding to the traveling direction TD by the method described above and segments a traveling direction image (step S1103).

After the traveling direction calculation unit 212 segments the traveling direction image, the display control unit 214 updates an image to be displayed on the traveling direction display region 111 to the newly segmented image (step S1104), and ends the processing.

During the processing above, the operation control unit 215 causes other applications to operate in accordance with an instruction from the user, and displays a related image on the first display region 112.

As described above, the portable device 100 is configured to be provided with a photograph unit 211 configured to acquire, at a first time interval, images of all peripheral directions around the portable device 100; a traveling direction calculation unit 212 configured to calculate a traveling direction TD of the portable device at a second time interval; an image segmentation unit 213 configured to segment, as a traveling direction image, an image of a predetermined range in which the traveling direction TD is positioned at a center thereof, from a latest one of the acquired images every time the traveling direction calculation unit 212 calculates the traveling direction; and a display control unit 214 configured to display the traveling direction image on a predetermined traveling direction display region 111 of a display 110 of the portable device. The display control unit 214 is further configured to display a video image designated by a user on a first display region 112, which is different from the traveling direction display region 111, of the display 110.

As described above, according to the present embodiment, the display 110 of the portable device 100 includes the traveling direction display region 111 for displaying a video image of the traveling direction, and the first display region 112 for displaying an image and/or information relating to an application being executed by the user. The portable device 100 is configured to calculate the traveling direction of the user at a very short predetermined time interval, and display an image of a predetermined range in which the traveling direction is positioned at the center thereof on the traveling direction display region 111 in substantially real time.

Accordingly, the user can see the video image of the traveling direction and the display of the application at the same time. In addition, the video image of the traveling direction is segmented from all-around images which are always acquired at a very short time interval, and thus changes smoothly as it follows the change in the traveling direction of the user. Therefore, it is possible to appropriately provide the surrounding information necessary for the user without decreasing the convenience.

As a result, the portable device 100 of the present embodiment makes it possible to display an image of the traveling direction on the display 110 even when another application is activated. The user 101 can confirm a situation in the traveling direction even when another application is executed. Therefore, the user 101 can recognize an obstacle in front of the traveling direction in advance, and avoid collision with the obstacle such as another person or an object.

Second Embodiment

Next, a second embodiment of the present invention will be described. In the first embodiment, a traveling direction is calculated only by using signals from the sensors mounted on the portable device 100. On the other hand, in the second embodiment, information of map data is further added to determine the traveling direction.

The portable device 100 according to the present embodiment basically has the same configuration and functions as those of the first embodiment. Hereinafter, the present embodiment will be described focusing on a configuration different from that of the first embodiment.

Figure 9A:
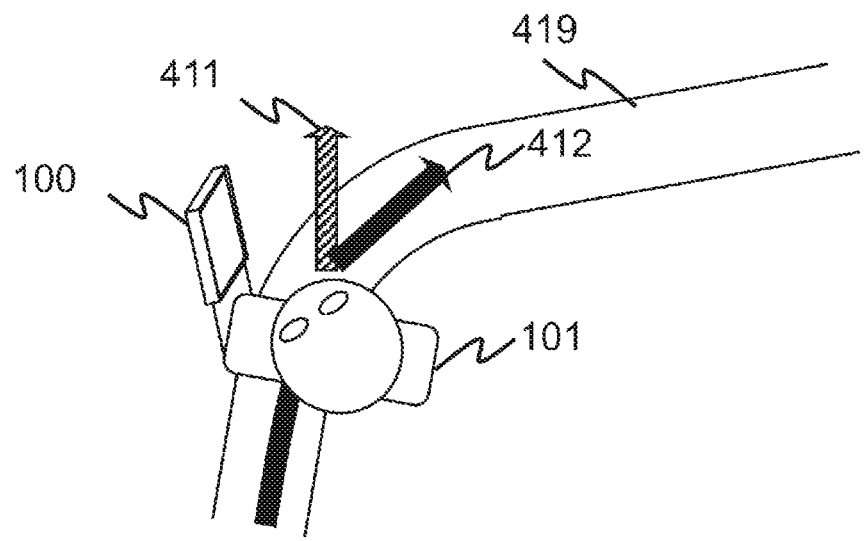
FIG. 9A and FIG. 9B explain an outline of a second embodiment.

As illustrated in FIG. 9A, it is assumed that a road 419 on which the user 101 is walking is curved. In such a case, when the traveling direction is determined only based on the sensors mounted on the portable device 100, the traveling direction TD is determined, for example, as a direction indicated by an arrow 411. However, the direction in which the user 101 is actually walking is a direction indicated by an arrow 412. In the present embodiment, the calculated traveling direction is corrected by using map data.

Figure 10:
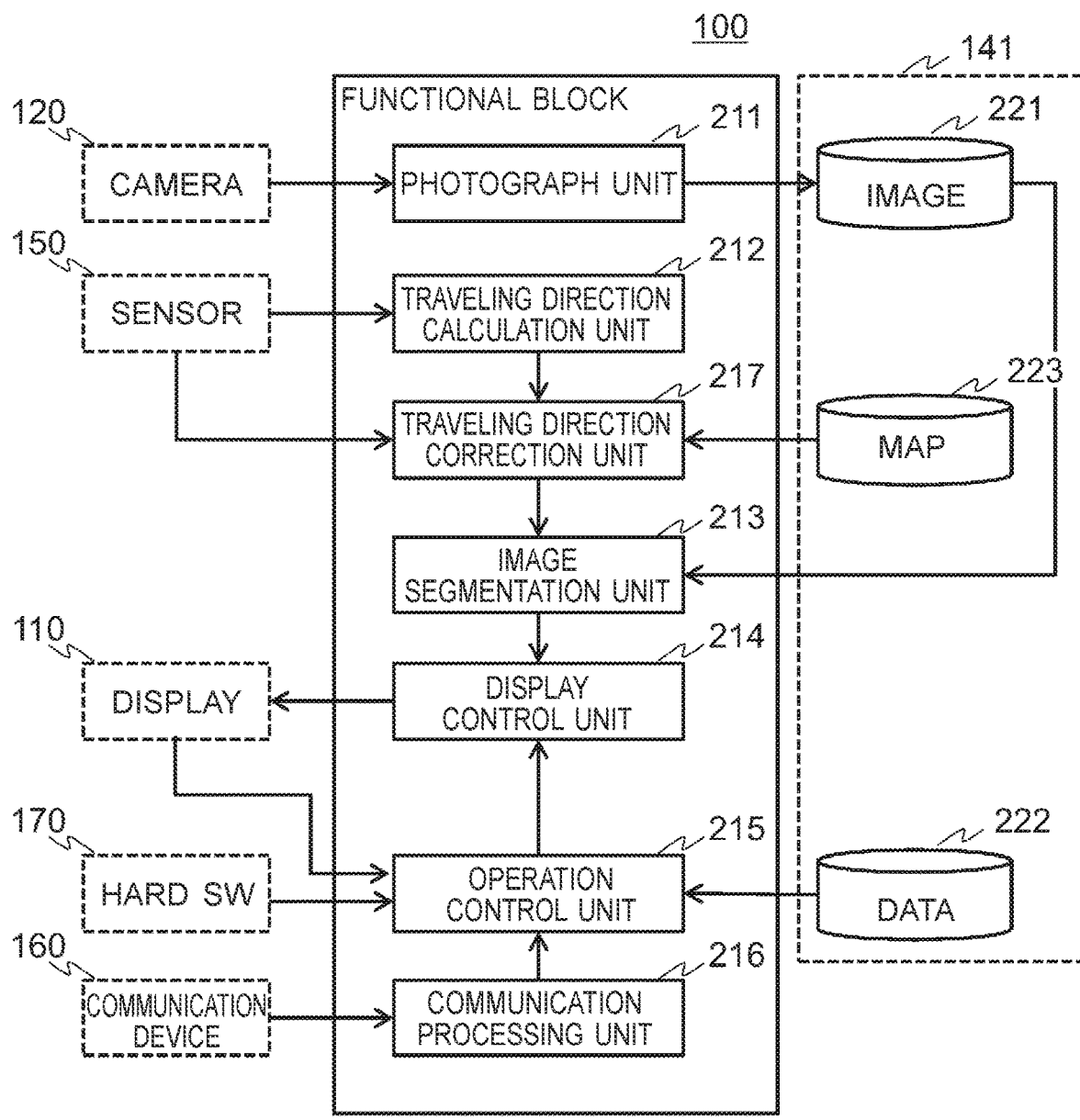
FIG. 10 is a functional block diagram of a portable device according to a second embodiment.

The hardware configuration of the portable device 100 according to the present embodiment for realizing the above is the same as the one according to the first embodiment. FIG. 10 is a functional block diagram of the portable device 100 according to the present embodiment. The functional block of the portable device 100 according to the present embodiment is basically the same as that of the first embodiment.

On the other hand, the present embodiment further includes a traveling direction correction unit 217 in addition to the configuration of the first embodiment. Furthermore, the flash memory 141 further includes a map storage unit 223 for storing map data. The map storage unit 223 may be provided in an external memory, etc. The map data is retrieved from a network, for example, via the communication device 160.

The map data is, for example, vector map data in which a feature is expressed by coordinates of three elements, i.e., a point, a line, and a polygon, and their connection relationship. The coordinate system used for the map data includes, for example, a UTM coordinate system, a planar rectangular coordinate system, and a WGS84 coordinate system. In the following description, a coordinate system in which a reference point is set and each coordinate value is expressed as the latitude, the longitude, and the altitude (geographic coordinate system) is used.

The traveling direction calculation unit 212 of the present embodiment specifies a traveling direction TD of the portable device 100 in the same manner as in the first embodiment. Hereinafter, the traveling direction TD calculated by the traveling direction calculation unit 212 by using the output of the acceleration sensor 154 and the gyro sensor 152 is referred to as a calculated traveling direction.

The traveling direction correction unit 217 is configured to correct the calculated traveling direction. The traveling direction correction unit 217 performs correction by using the map data and information of a current position of the portable device 100 acquired by the GPS receiver 151. The traveling direction after the correction is called a corrected traveling direction.

[Corrected Traveling Direction Calculation Processing]

Figure 11A:
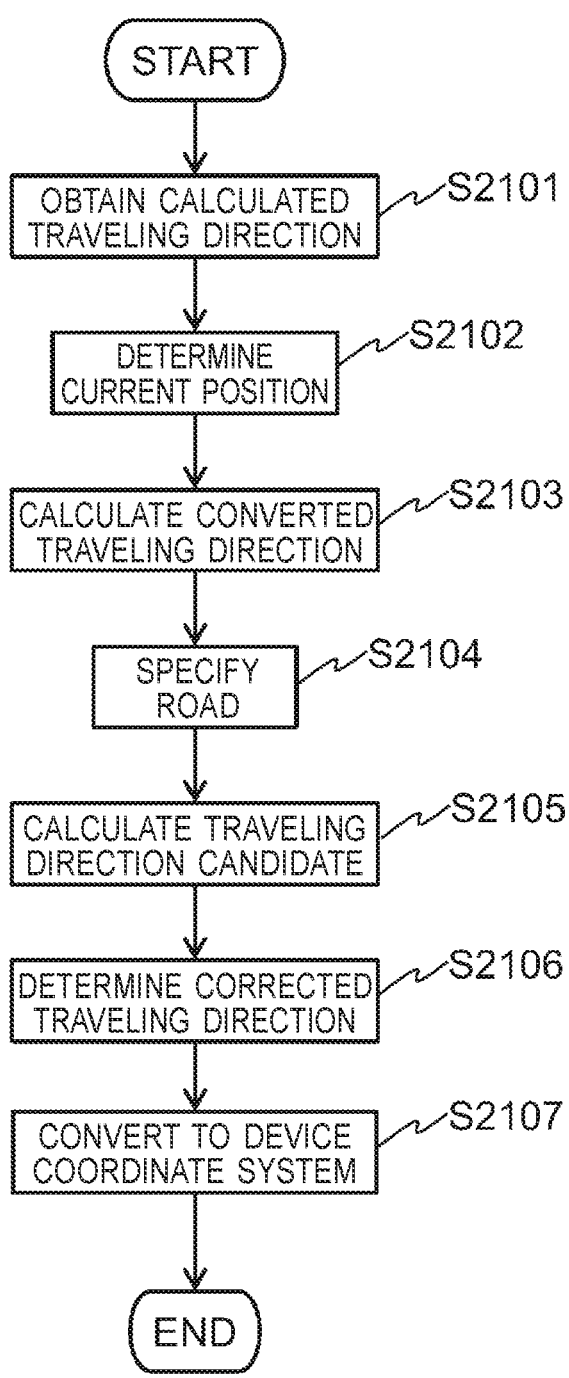
FIG. 11A illustrates a flow chart of traveling direction calculation processing according to the second embodiment, and FIG. 11B and FIG. 11C explain the traveling direction calculation processing according to the second embodiment.
Figure 11B:
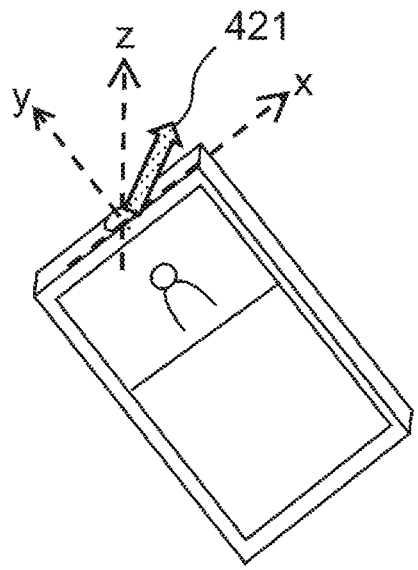

A flow of corrected traveling direction calculation processing performed by the traveling direction calculation unit 212 will be described with reference to FIG. 11A and FIG. 11B. FIG. 11A illustrates a processing flow of the corrected traveling direction calculation processing.

First, the traveling direction calculation unit 212 obtains the calculated traveling direction 421 by the method of the first embodiment (step S2101). As illustrated in FIG. 11B, the calculated traveling direction 421 is calculated as a unit vector on the device coordinate system of the portable device 100.

Figure 11C:
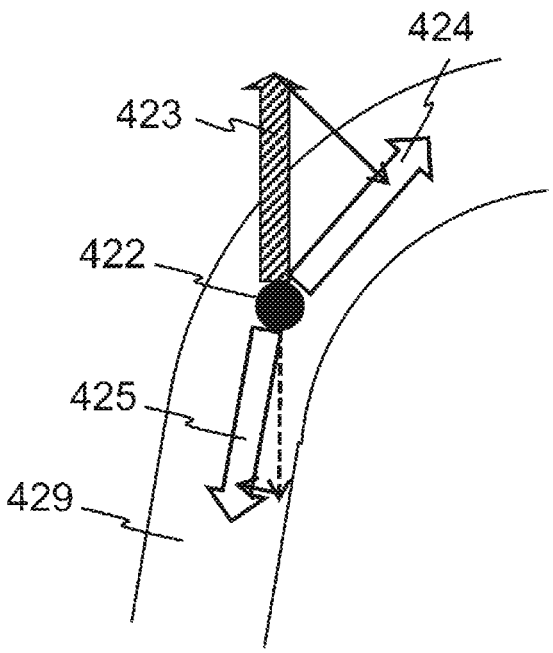

Next, the traveling direction correction unit 217 determines a current position 422 of the portable device 100 based on signals from the GPS receiver 151 (step S2102). As illustrated in FIG. 11C, the current position is calculated as a value of the geographic coordinate system.

Then, the traveling direction correction unit 217 sets the origin of the device coordinate system as the current position 422, converts the calculated traveling direction 421 into a value of the geographic coordinate system, and calculates a converted traveling direction 423 (step S2103). In addition, the traveling direction correction unit 217 specifies a road 429 where the user 101 of the portable device 100 is currently present based on the information of the current position 422 on the geographic coordinate system and the map data (step S2104).

After specifying the road 429, the traveling direction correction unit 217 calculates traveling direction candidates by using the map data (step S2105). The traveling direction candidates are, for example, a direction in which the road 429 passing over the current position 422 extends, and a direction in which a branch path within a predetermined range extends. In an example of FIG. 11C, two directions including a traveling direction candidate 424 and a traveling direction candidate 425 are extracted as the traveling direction candidates. In this connection, a range in which the traveling direction candidates are extracted may be predetermined or may be determined in accordance with the speed of the user 101 obtained from the output of the acceleration sensor 154.

Then, the traveling direction correction unit 217 calculates the components of each of the extracted traveling direction candidates 424, 425 with respect to the converted traveling direction 423. The components are calculated including positive and negative values. The traveling direction correction unit 217 determines a direction having the largest component as the corrected traveling direction (step S2106). In the example of FIG. 11C, the component in the direction of the traveling direction candidate 424 has a positive value. On the other hand, the component in the direction of the traveling direction candidate 425 has a negative value. Therefore, the traveling direction candidate 424 is determined as the corrected traveling direction.

Then, the traveling direction correction unit 217 converts the corrected traveling direction which has been determined to the device coordinate system (step S2107), and ends the processing.

The steps after determining the traveling direction proceed in the same manner as those in the first embodiment. Meanwhile, in the present embodiment, the image segmentation unit 213 segments an image by using the corrected traveling direction instead of using the calculated traveling direction 421.

As described above, the portable device 100 according to the present embodiment further includes the traveling direction correction unit 217 configured to correct the calculated traveling direction by using the map data, in addition to the configuration of the first embodiment. That is, according to the present embodiment, the traveling direction is determined also by using the map data. Therefore, the traveling direction can be determined with high accuracy, and necessary information can be provided to the user who is moving.

Figure 9B:
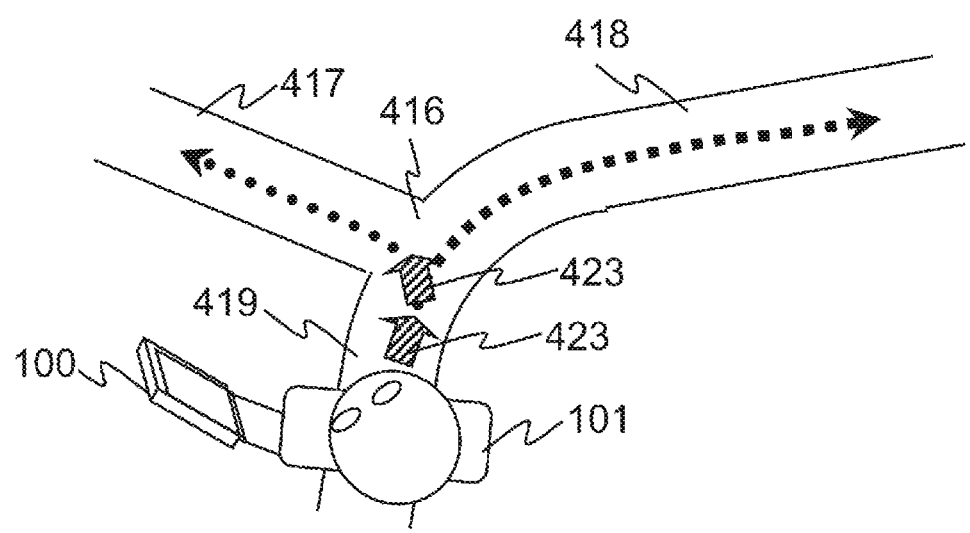

Furthermore, according to the present embodiment, for example as illustrated in FIG. 9B, even when the road 419 is branched to a road 417 and a road 418 at the front of the traveling direction, it is possible to continue to provide the user 101 with information of the traveling direction with high accuracy.

As approaching a branch point 416, the user 101 holding the portable device 100 changes the traveling direction in a direction of the road on which he or she wants to travel. In the present embodiment, a traveling direction candidate having a large component of the calculated traveling direction (converted traveling direction) 423 is selected from among a plurality of extracted traveling direction candidates. Therefore, the direction of the road on which the user wants to walk is likely to be calculated as the corrected traveling direction.

In the example of FIG. 9B, when the user 101 walking on the road 419 wants to move from the branch point 416 to the road 417, the user 101 moves along the road 419 up to the branch point 416. Accordingly, the component of the calculated traveling direction (converted traveling direction) 423 becomes large in the direction of the road 418 which is an extending direction of the road 419. As a result, the extending direction of the road 418 is calculated as the corrected traveling direction, and a corresponding traveling direction image is displayed on the display 110.

As approaching the branch point 416, the user 101 directs the traveling direction toward the road 417. Accordingly, the extending direction of the road 417 is selected as the traveling direction candidate having the largest component of the calculated traveling direction (converted traveling direction) 423 at a predetermined timing. As a result, the extending direction of the road 417 is determined as the corrected traveling direction, and a corresponding traveling direction image is displayed on the display 110.

Figure 12:
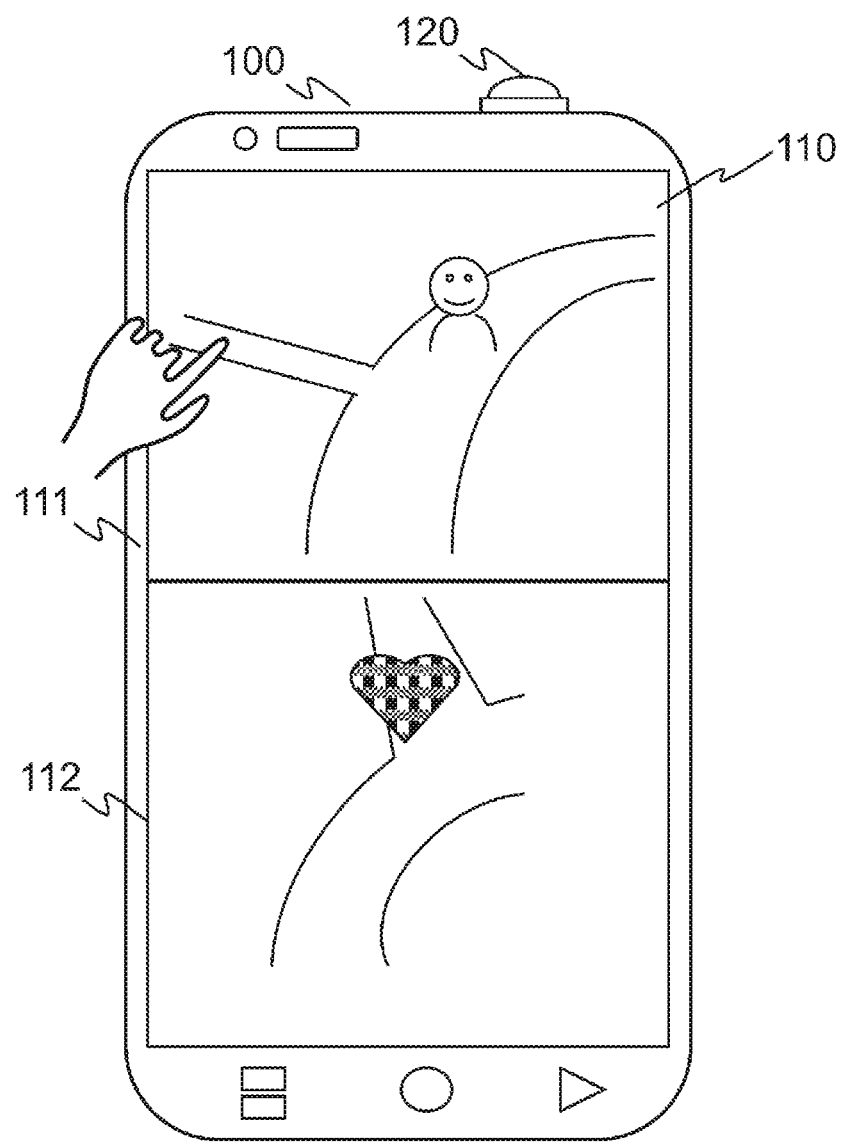
FIG. 12 explains a modification of the second embodiment.

In this connection, it may be configured that the traveling direction can be designated by the user 101. In such a case, the traveling direction correction unit 217 receives an instruction of the traveling direction from the user via the display 110. Specifically, for example as illustrated in FIG. 12, the user 101 designates a desired traveling direction on the traveling direction image displayed on the screen by, such as tapping or the like.

In response to the designation from the user 101, the traveling direction correction unit 217 determines the corrected traveling direction with reference to the displayed traveling direction image and the map data.

Modifications

In each of the embodiments described above, an omnidirectional image is acquired as an image from which the traveling direction image is segmented, however, the present invention is not limited thereto. The image from which the traveling direction image is segmented may be a super wide angle of which a maximum value reaches all peripheral directions, for example, may be a hemispherical image. In addition, it may be a cylindrical surface image, for example, with the y-axis of the portable device 100 as a central axis.

Figure 13A:
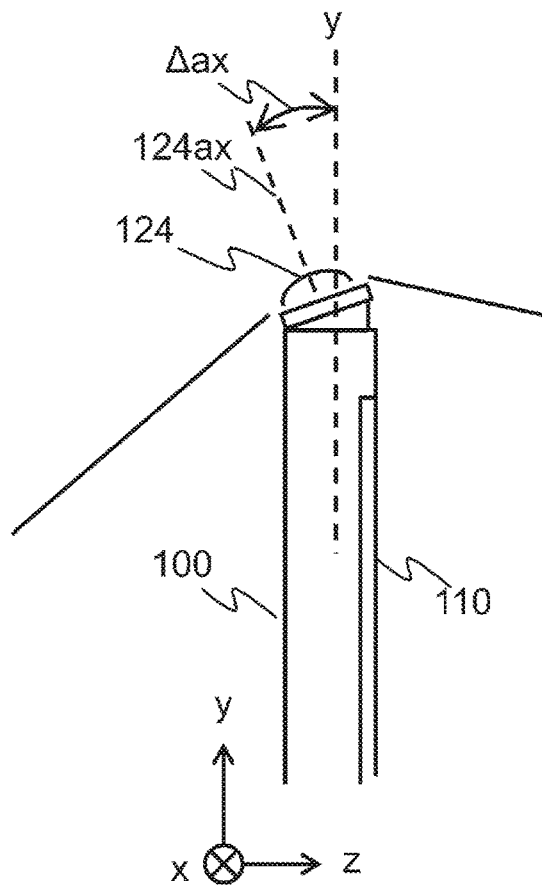
FIGS. 13A to 13C explain a camera according to a modification of the present invention.

For example, as illustrated in FIG. 13A, a camera 124 capable of capturing an image within a predetermined range on the back side of the portable device 100 may be used. In this case, the camera 124 is disposed at the top (upper end) of the portable device 100 such that an optical axis 124ax of the optical system thereof is inclined toward the back surface side of the portable device 100 by Δax with respect to the y-axis which is one of the central axes of the portable device 100.

Generally, the user 101 holds the portable device 100 at an angle slightly inclined in a direction in which a screen of the display 110 faces upward from a vertical position facing the user 101. When the y-axis of the portable device 100 and the optical axis 124ax coincide with each other, the camera 124 faces upward and an effective photographing area decreases. Corresponding to such holding posture of the user 101, in the present modification, the camera 124 is arranged as described above in order to increase the photographing angle on the ground side.

Figure 13C:
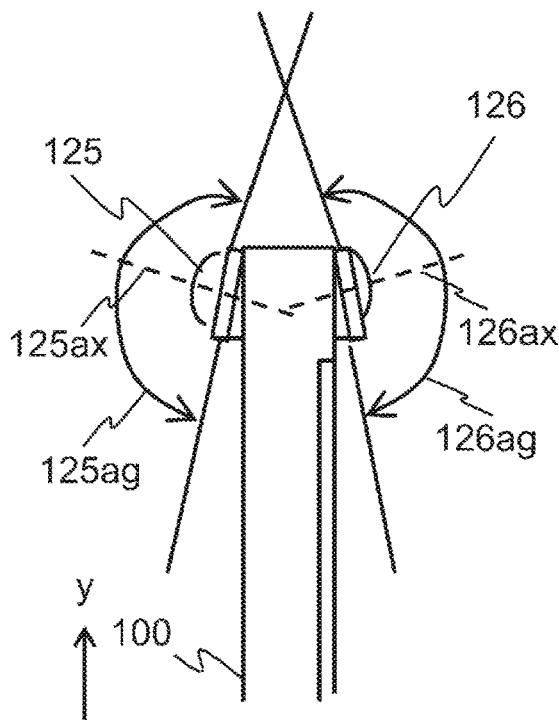
Figure 13B:
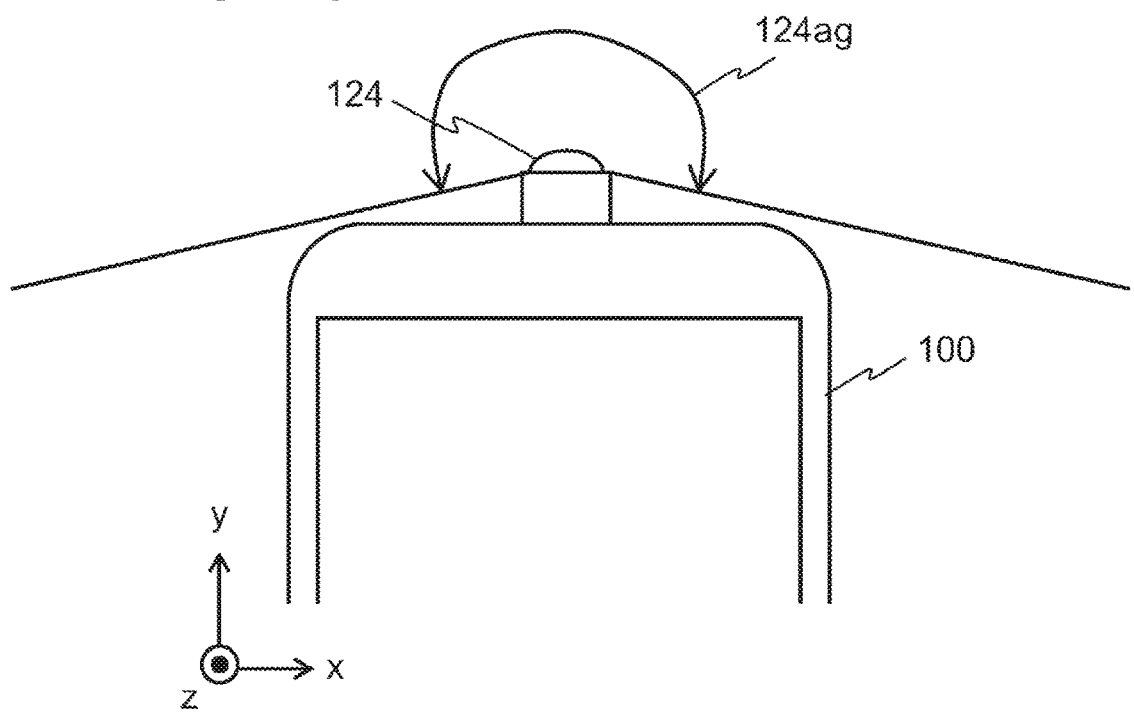

FIG. 13B illustrates a photographing angle of view 124ag when the portable device 100 is viewed from the front in a case where the camera 124 is disposed as illustrated in FIG. 13A. The photographing angle of view 124ag is a wide angle exceeding 180 degrees. The angle of view and the number of sensor pixels of the camera 124 are selected taking account of a balance which allows to appropriately secure resolution while having a wide-angle.

The camera 124 is configured as above, and accordingly, even if the all-around camera 121 is not used and also a traveling direction is greatly different from a holding direction of the portable device 100, it is possible to obtain an image of the traveling direction.

Furthermore, as illustrated in FIG. 13C, a camera may be configured to include two wide angle cameras 125, 126 which are arranged on the front and rear faces of the portable device 100. Each of the wide angle cameras 125, 126 has a predetermined angle of view. The two wide angle cameras 125, 126 are arranged such that each of an optical axis 125ax and an optical axis 126ax forms a predetermined angle with respect to the z-axis of the portable device 100. In an example illustrated in FIG. 13C, the predetermined angle is θb (0°<θb<180°. In this case, for example, the original data acquired by each of the two wide angle cameras 125, 126 is separately arranged in a different pixel memory.

With this configuration, even when the angle of view of each of the cameras 125, 126 is within 180 degrees, by composing images captured by the cameras 125, 126, blind spots of the cameras 125, 126 are compensated for each other, whereby it is possible to obtain wide range images.

Still further, the all-around camera may be realized by mounting an attachment on each of the front camera 122 and the rear camera 123. An example of a configuration in this case will be described with reference to FIGS. 14A to 14E.

In the present modification, each of super wide angle lens attachments 511, 512 is mounted respectively on the front camera 122 and the rear camera 123 to realize an all-around camera.

Figure 14A:
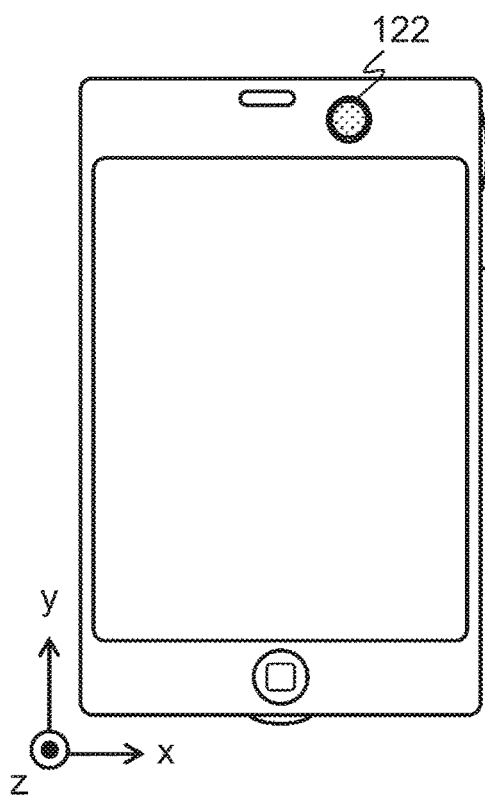
FIGS. 14A to 14E explain a camera according to a modification of the present invention.
Figure 14B:
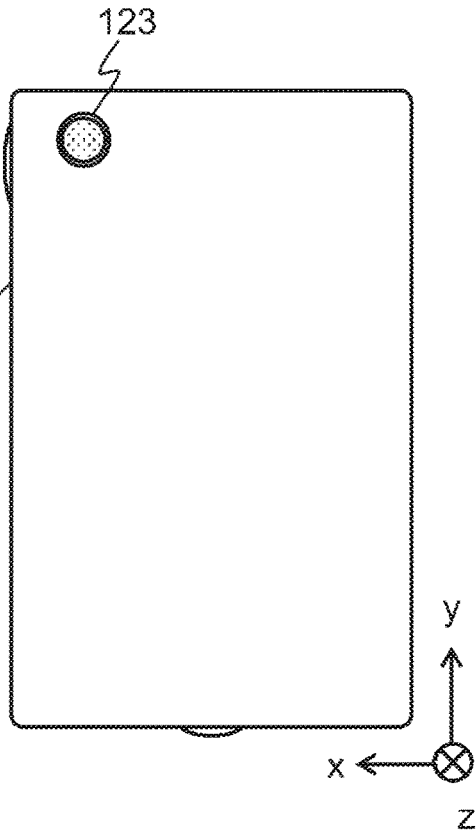
Figure 14C:
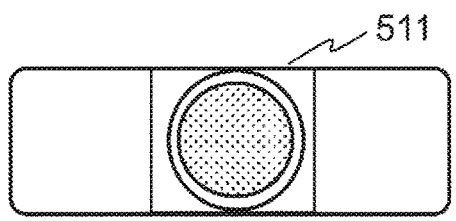
Figure 14D:
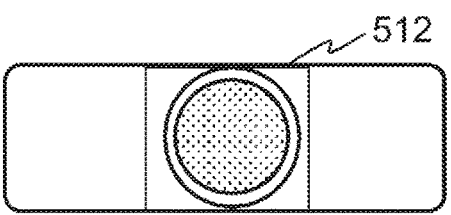
Figure 14E:
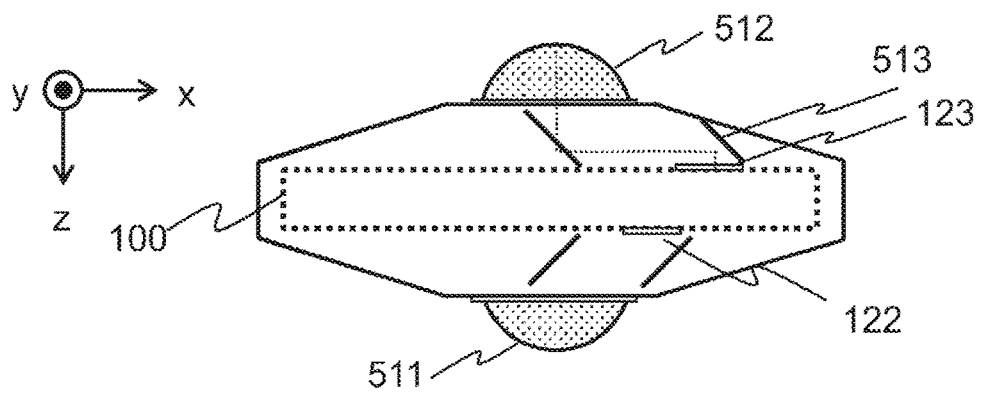

Each of the super wide angle lens attachments 511, 512 is, as illustrated in FIG. 14C and FIG. 14D, an attachment which is put on a camera having a normal angle of view to realize super wide angle imaging. For example, the super wide angle lens attachment is formed by a wide conversion lens. As illustrated in FIG. 14E, each of the super wide angle lens attachments 511, 512 is put over the lens of the front camera 122 and that of the rear camera 123, respectively.

In this connection, for example, when the portable device 100 is an ordinary smartphone, as illustrated in FIG. 14A and FIG. 14B, the x-coordinate and the y-coordinate of a mounting position of the front camera 122 and those of the rear camera 123 are different from each other. Accordingly, the optical axes of the two cameras 122, 123 are different from each other. In order to correct this difference, a group of reflectors or a group of correction lenses 513 may be provided in the super wide angle lens attachments 511, 512.

As illustrated in FIG. 14E, by changing arrangement positions of the group of reflectors and the group of correction lenses 513, parallax shift is adjusted so as to match the optical axes of the super wide angle lenses realized by the super wide angle lens attachment 511, 512. With this configuration, photographing of all peripheral directions can be realized by the front camera 122 and the rear camera 123. In this connection, a mirror configuring the group of correction lenses 513 is arranged so as to form an angle of 45 degrees so that the natural light is accurately irradiated to sensors (front camera 122 and rear camera 123).

Figure 15A:
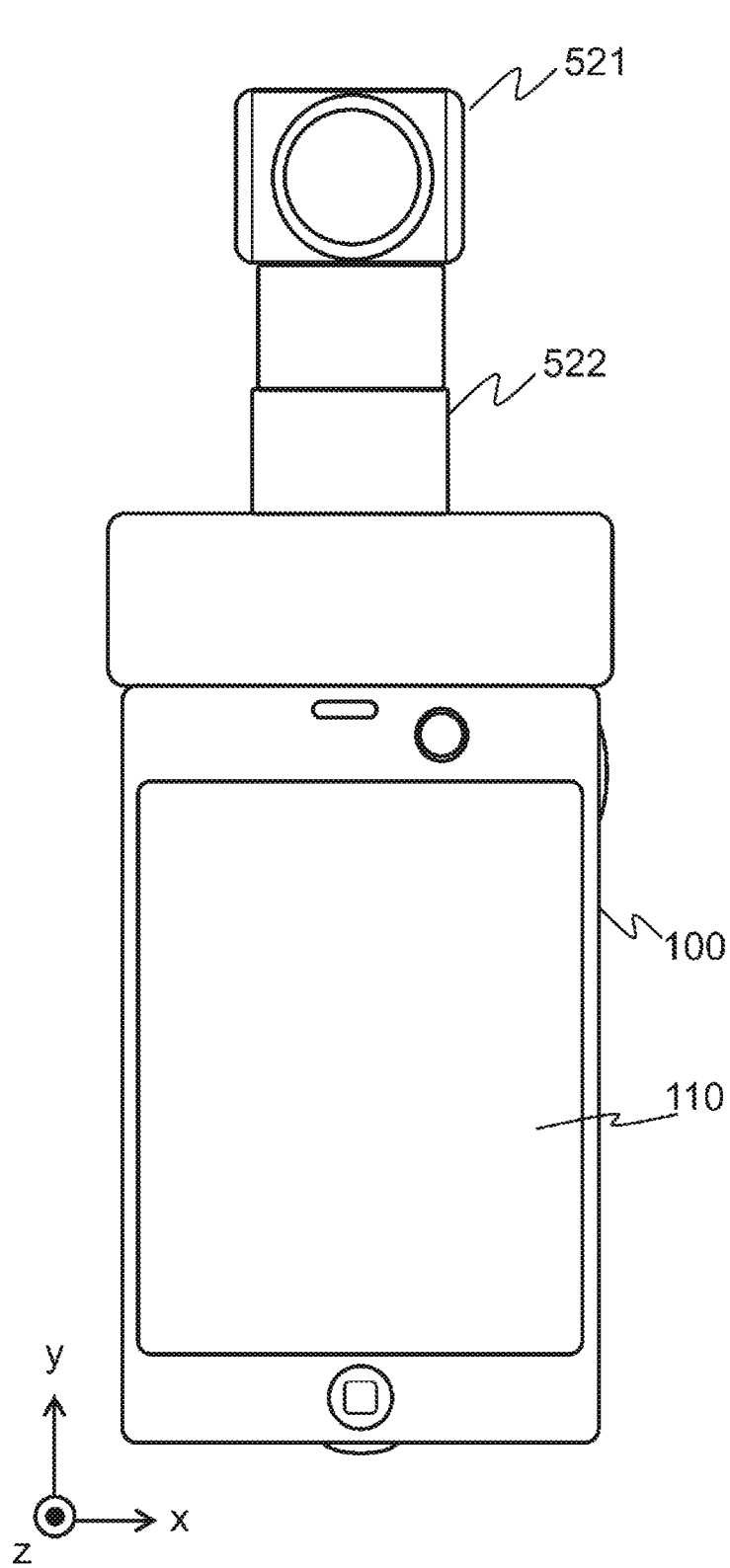
FIGS. 15A and 15B explain a camera according to a modification of the present invention.
Figure 15B:
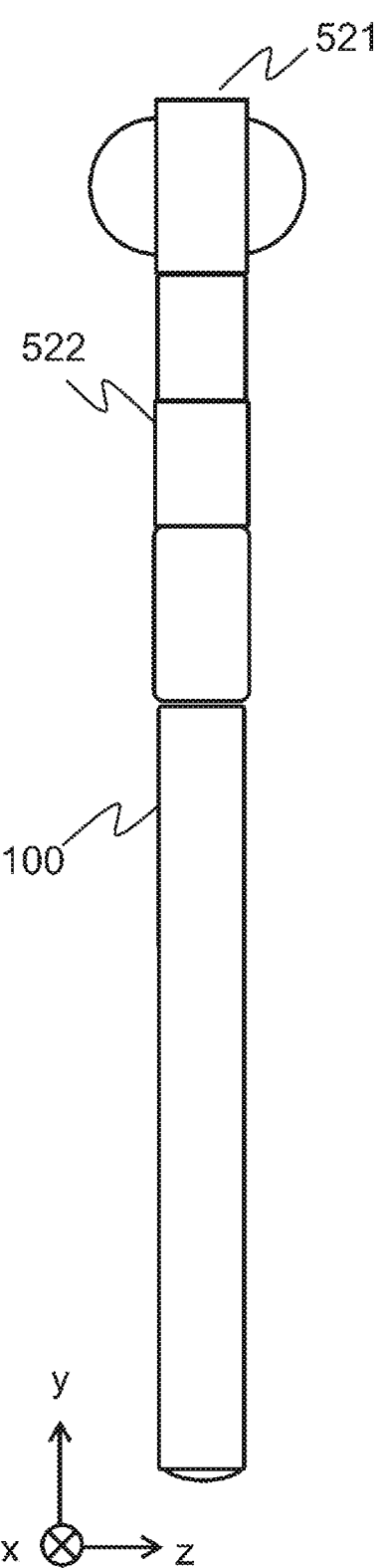
Figure 16A:
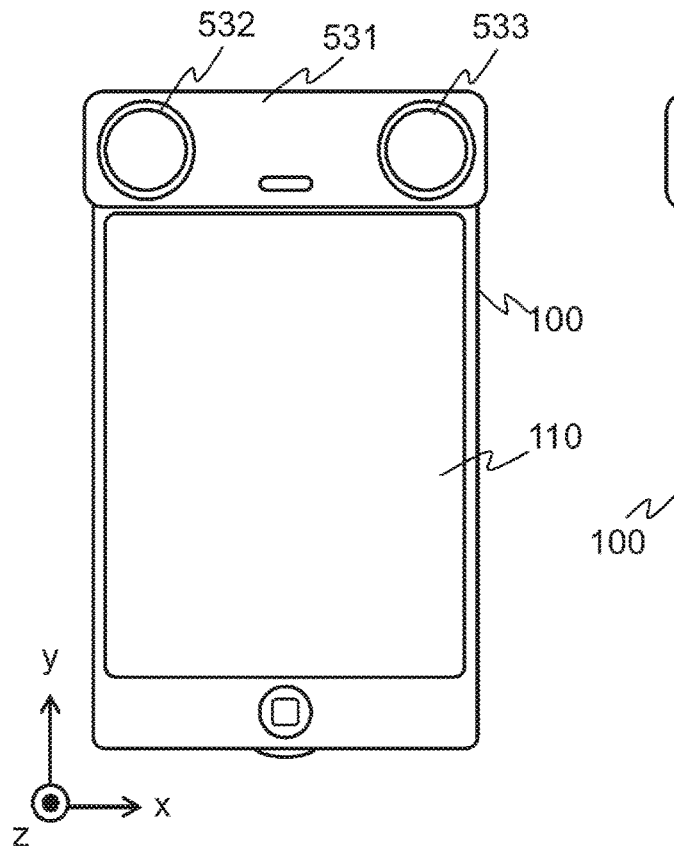
FIGS. 16A to 16E explain a camera according to a modification of the present invention.
Figure 16B:
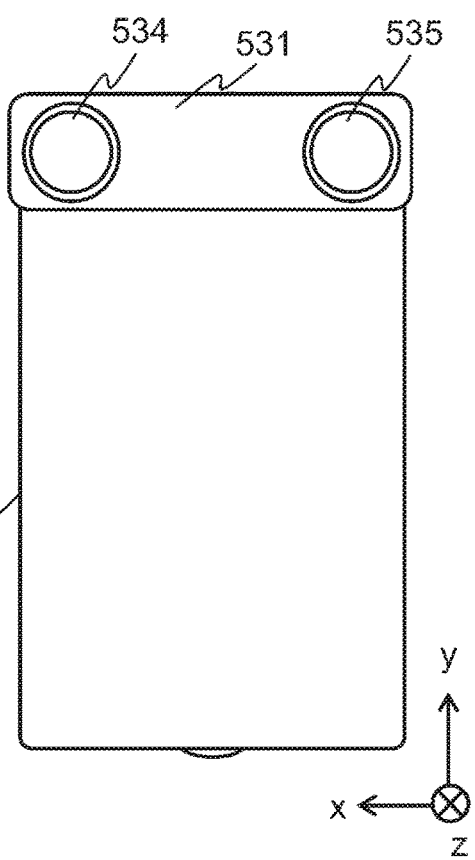
Figures 16C, 16D:
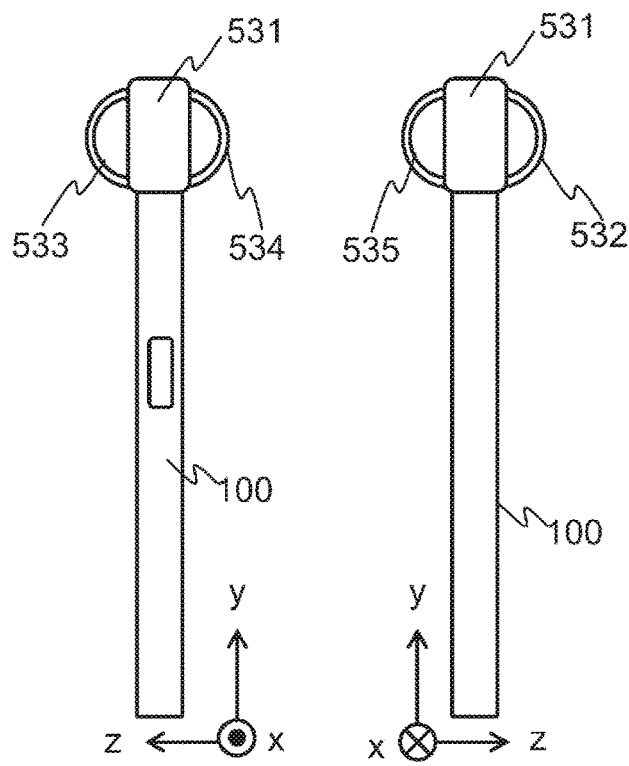
Figure 16E:
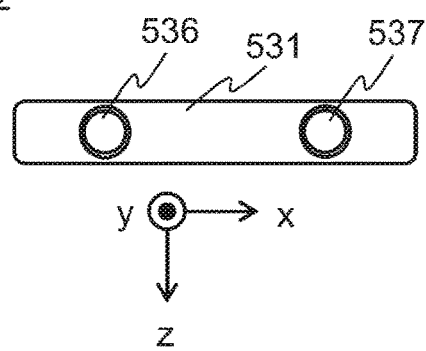

Another modification of the all-around camera 121 is illustrated in FIG. 15A and FIG. 15B.

In this modification, the all-around camera 121 is realized by connecting an external all-around camera 521 to the portable device 100 as an attachment. The external all-around camera 521 is connected thereto via a USB I/F, etc. provided as the expansion I/F 180.

The external all-around camera 521 may include, for example, an extensible member 522. The extensible member 522 allows to capture a wide range image from a high position as if craning the neck.

Another example is illustrated in FIG. 16. A modification illustrated in FIGS. 16A to 16E is an example in which the portable device 100 is configured in the specification capable of capturing a 3D image.

In this modification, a plurality of cameras is mounted on the front, rear, and upper faces of the portable device 100, respectively. The present modification is realized by connecting an attachment 531 including a plurality of cameras 532 to 537 to the portable device 100 via a USB I/F, etc.

In the example of FIGS. 16A to 16E, six cameras are arranged in total such that two cameras (cameras 532, 533) are arranged on a front face of the attachment 531 connected to the portable device 100, two cameras (cameras 534, 535) are arranged on a rear face thereof, and two cameras (cameras 536, 537) are arranged on an upper face thereof.

In a case where a plurality of cameras is respectively provided on each face, for example as compared with a case of including one on the front face and one on the rear face, it is possible to narrow the angle of view of each camera. With this configuration, it is possible to realize resolution enhancement in photographing of all peripheral directions. In other words, as compared with the case of capturing a 180-degree image with two cameras, in the case of capturing an image in the same range with four cameras, when the resolution of each camera is the same, it is possible to capture the image with the resolution of about twice. In this way, by increasing the number of cameras, the resolution of the captured image can be improved.

In this case, if the installation positions of each camera are not aligned, displacement of the viewpoints, so-called parallax is likely to occur. Accordingly, it is desirable to align the installation positions of the cameras. Aligning the installation positions means, for example, aligning the coordinate values in the y-axis direction among a group of cameras on the same face and aligning coordinate values in the x-axis direction among a group of cameras on different faces. In this connection, if the installation positions are not aligned in this way, the displacement described above may be corrected by performing image processing with respect to the captured image data.

Between the two cameras arranged on each face, a predetermined interval is provided. In other words, a base line length is set to a predetermined distance, thereby making it possible to capture a super wide angle 3D image. In this case, the thickness of the attachment 531 may be set to be approximately the same as the base line length in order to obtain a sufficient base line length also between the front cameras 532, 533 and the rear cameras 534, 535. With this configuration, it is possible to realize the arrangement of a plurality of cameras in which a sufficient baseline length is secured for any direction of the portable device 100.

In this connection, when a sufficient base line length cannot be set between each camera, correction may be performed by performing predetermined image processing with respect to the obtained data.

The present invention is not limited to the embodiments described above, but includes various modifications. For example, the embodiments described above are intended to be provided to explain the present invention in a way that is easy to understand, and not necessarily limited to those having all the configurations described above. In addition, it is possible to replace a part of the configuration of one embodiment with the configuration of another embodiment, and it is also possible to add the configuration of one embodiment to the configuration of another embodiment. Furthermore, it is possible to add, delete, and replace a part of the configuration of each embodiment.

Still further, each of the above-described configurations, functions, processing units, processing means, and the like may be partially or entirely implemented in hardware by, for example, designing an integrated circuit.

Still further, the control lines and the information lines which are considered to be necessary for the purpose of explanation are indicated herein, and not all the control lines and the information lines of actual products are necessarily indicated. It may be considered that almost all the configurations are actually connected to each other.

REFERENCE SIGNS LIST

100: portable device, 101: user, 105: network, 110: display, 111: traveling direction display region, 112: first display region, 120: camera, 121: all-around camera, 121a: wide angle camera, 121b: wide angle camera, 122: front camera, 123: rear camera, 124: camera, 124ag: photographing angle of view, 124ax: optical axis, 125: camera, 125ax: optical axis, 126: camera, 126ax: optical axis, 130: CPU, 131: system bus, 140: storage device, 141: flash memory, 142: SD-RAM, 143: external memory I/F, 150: sensor, 151: GPS receiver, 152: gyro sensor, 153: barometer, 154: acceleration sensor, 155: geomagnetic sensor, 160: communication device, 161: proximity wireless communication device, 162: wireless communication device, 163: telephone network communication device, 164: wireless LAN I/F, 170: hard SW, 180: expansion I/F 211: photograph unit, 212: traveling direction calculation unit, 213: image segmentation unit, 214: display control unit, 215: operation control unit, 216: communication processing unit, 217: traveling direction correction unit, 221: image storage unit, 222: data storage unit, 223: map storage unit, 311: optical axis, 320: image sensor, 320a: virtual curved surface, 330: subject, 411: traveling direction, 412: traveling direction, 416: branch point, 417: road, 418: road, 419: road, 421: calculated traveling direction, 422: current position, 423: converted traveling direction, 424: traveling direction candidate, 425: traveling direction candidate, 429: road, 511: super wide angle lens attachment, 512: super wide angle lens attachment, 513: reflector, correction lens, 521: all-around camera, 522: extensible member, 531: attachment, 532: camera, 533: camera, 534: camera, 535: camera, 536: camera, 537: camera, P: principal point P, TD: traveling direction, f: focal length

The invention claimed is:

1. A portable device comprising:
a photograph unit configured to acquire a peripheral image around the portable device;
a traveling direction determination unit configured to determine a traveling direction;
an image segmentation unit configured to obtain a traveling direction image from the peripheral image, within a predetermined range in which the traveling direction is positioned at a center thereof;
a display control unit configured to display the traveling direction image;
an acceleration sensor configured to detect acceleration of the portable device;
a gyro sensor configured to detect posture of the portable device;
a radio wave reception processing unit configured to receive radio waves from a positioning satellite so as to determine a current position of the portable device;
map data; and
a traveling road direction determination unit configured to determine a traveling road direction which is one of two extending directions of a road specified based on the current position, the map data, and a movement direction of the portable device calculated by the acceleration and/or the posture,
wherein the traveling direction determination unit is further configured to set the traveling road direction as the traveling direction, and
wherein the display control unit is further configured to display a video image on a first display region, which is different from a second display region to display the traveling direction image.

2. The portable device according to claim 1, wherein the traveling direction determination unit is further configured to use the map data to specify a branch path, which is branched from the specified road, in a predetermined range in which the current position is positioned as a center thereof, set extending directions of each of the road and the branch path as traveling direction candidates, and select, as the corrected traveling direction, a direction closest to the traveling direction from among the traveling direction candidates.

3. The portable device according to claim 1, further comprising a wide angle camera having an angle of view of 180 degrees or more, wherein
the photograph unit is further configured to store data acquired by the wide angle camera at a pixel position associated in advance with each photographing direction so to acquire an image, and
the image segmentation unit is further configured to set, as the center, a pixel position stored in association with one of the photographing directions which is a same direction as the traveling direction.

4. The portable device according to claim 3, wherein the wide angle camera is configured by two cameras such that each of the two cameras having an angle of view of 180 degrees is attached respectively to a front face and a rear face of the portable device.

\* \* \* \* \*